United States Patent
Nory et al.

(10) Patent No.: US 10,172,156 B2
(45) Date of Patent: Jan. 1, 2019

(54) METHOD AND APPARATUS FOR SCHEDULING UPLINK TRANSMISSIONS WITH REDUCED LATENCY

(71) Applicant: Motorola Mobility LLC, Chicago, IL (US)

(72) Inventors: Ravikiran Nory, Buffalo Grove, IL (US); Vijay Nangia, Algonquin, IL (US); Hossein Bagheri, Urbana, IL (US); Ravi Kuchibhotla, Gurnee, IL (US)

(73) Assignee: Motorola Mobility LLC, Chicago, IL (US)

( * ) Notice: Subject to any disclaimer, the term of this patent is extended or adjusted under 35 U.S.C. 154(b) by 58 days.

(21) Appl. No.: 15/262,499

(22) Filed: Sep. 12, 2016

(65) Prior Publication Data

US 2018/0077721 A1 Mar. 15, 2018

(51) Int. Cl.
*H04W 72/14* (2009.01)
*H04L 5/00* (2006.01)
(Continued)

(52) U.S. Cl.
CPC ........... *H04W 72/14* (2013.01); *H04L 5/0007* (2013.01); *H04W 72/0466* (2013.01); *H04W 76/14* (2018.02)

(58) Field of Classification Search
CPC .. H04W 72/14; H04W 72/0466; H04L 5/0007
See application file for complete search history.

(56) References Cited

U.S. PATENT DOCUMENTS

2009/0280798 A1 11/2009 Meylan
2010/0040028 A1 2/2010 Maheshwari
(Continued)

FOREIGN PATENT DOCUMENTS

EP 2846488 A1 3/2015
EP 2938142 A1 10/2015
(Continued)

OTHER PUBLICATIONS

3GPP TSG-RAN WG2 Meeting #91 R2-153548 Beijing, China, Aug. 24-28, 2015 Agenda item: Consideration on Random Access for Heterogeneous TTIs in a Carrier.*
(Continued)

*Primary Examiner* — Yemane Mesfin
*Assistant Examiner* — Henry Baron
(74) *Attorney, Agent, or Firm* — Matthew C. Loppnow; The Watson I.P. Group, PLC

(57) ABSTRACT

A method and apparatus schedule uplink transmissions with reduced latency. A number of symbols used for UL transmissions in a TTI can be compared to a threshold value of symbols. An indication can be sent from a device on a sidelink channel. The indication can indicate the location of symbols used for an UL transmission when the UL transmission occupies a number of symbols less than the threshold value. Both a sidelink transmission and the UL transmission can be transmitted in the TTI when the UL transmission occupies the number of symbols less than the threshold value. Only the UL transmission can be transmitted in the TTI when the UL signal occupies a number of symbols that are at least the threshold value.

21 Claims, 9 Drawing Sheets

(51) Int. Cl.
H04W 72/04 (2009.01)
H04W 76/14 (2018.01)

(56) References Cited

U.S. PATENT DOCUMENTS

| | | | |
|---|---|---|---|
| 2012/0113966 | A1 | 5/2012 | Tao |
| 2012/0147801 | A1 | 6/2012 | Ho |
| 2013/0329711 | A1 | 12/2013 | Seo |
| 2015/0208402 | A1 | 7/2015 | Hwang |
| 2015/0282104 | A1 | 10/2015 | Damnjanovic |
| 2015/0326373 | A1* | 11/2015 | Ryu ............... H04L 5/0053 370/330 |
| 2015/0327188 | A1* | 11/2015 | Bagheri ........... H04W 52/383 455/426.1 |
| 2015/0334729 | A1* | 11/2015 | Ji .................. H04W 72/0453 370/336 |
| 2016/0029239 | A1 | 1/2016 | Sadeghi |
| 2016/0205631 | A1 | 7/2016 | Chen |
| 2017/0208575 | A1 | 7/2017 | Chen |
| 2017/0223695 | A1 | 8/2017 | Kwak |
| 2017/0325181 | A1 | 11/2017 | Hwang |
| 2017/0332365 | A1 | 11/2017 | Lin |
| 2017/0359734 | A1 | 12/2017 | Lee |
| 2017/0366311 | A1 | 12/2017 | Iyer |
| 2018/0014255 | A1 | 1/2018 | Pelletier |
| 2018/0027510 | A1 | 1/2018 | Yi |

FOREIGN PATENT DOCUMENTS

| | | |
|---|---|---|
| WO | 2015/179136 A1 | 11/2015 |
| WO | 2015179136 A1 | 11/2015 |
| WO | 2016048593 A1 | 3/2016 |
| WO | 2016048593 A1 | 8/2016 |
| WO | 2016178760 A1 | 11/2016 |

OTHER PUBLICATIONS

Munoz, Andres, PCT Search Report and Written Opinion, International Application No. PCTIUS2017/023607, European Patent Office, dated Jul. 6, 2017.
Etri, "Consideration on Heterogeneous TTIs in a Carrier," R2-154563; 3GPP TSG-RAN WG2 Meeting #91bis, Oct. 5-9, 2015, Malmo, Sweden.
Andres, PCT International Search Report, International application No. PCT/US2017/023667, European Patent Office, P.B. 5818 Patentlaan 2 NL—2280 HV Rijswijk, dated Jun. 29, 2017.
Etri: "Consideration on Heterogeneous TTIs in a Carrier", 3GPP Draft; R2-154563 Consideration on Heterogeneous TTIs, 3rd Generation Prtnership Project (3GPP), Mobile Competence Cenre; 650, Route Des Lucioles; F-06921 Sophia-Antipolis Cedex; France, vol. RAN WG2, No. Malmo, Sweden; Oct. 5, 2015-Oct. 9, 2015, Oct. 4, 2015 (Oct. 4, 2015).
"3rd Generation Partnership Project; Technical Specification Group Radio Access Network; Evolved Universal Terrestrial Radio Access (E-UTRA); Medium Access Control (MAC) protocol specification (Release 13)", 3GPP Standard; 3GPP TS 36.321, RD Generation Prtnership Project (3GPP), Mobile Competence Cenre; 650, Route Des Lucioles; F-06921 Sophia-Antipolis Cedex; France, vol. RAN WG2, No. V13.0.0, Jan. 14, 2016 (Jan. 14, 2016).
Christopoulou, PCT International Search Report, International application No. PCT/US2017/023880, European Patent Office, P.B. 5818 Patentlaan 2 NL—2280 HV Rijswijk, dated Jun. 20, 2017.
Zte et al: :"Simultaneous transmission in sTTI", 3GPP Draft; R1-1701970 Simultaneous Transmission in STTI, 3rd Generation Prtnership Project (3GPP), Mobile Competence Cenre; 650, Route Des Lucioles; F-06921 Sophia-Antipolis Cedex; France, vol. RAN WG1, No. Athens, Greece; Feb. 13, 2017-Feb. 17, 2017, Feb. 6, 2017 (Feb. 6, 2017).
Yang, PCT International Search Report, International application No. PCT/US2017/023918, European Patent Office, P.B. 5818 Patentlaan 2 NL—2280 HV Rijswijk, dated Jun. 8, 2017.
Zte: "L1 Considerations on latency reduction", 3GPP Draft; R1-157151 L1 Considerations on Latency Reduction, 3rd Generation Prtnership Project (3GPP), Mobile Competence Cenre; 650, Route Des Lucioles; F-06921 Sophia-Antipolis Cedex; France, vol. RAN WG1, No. Anaheim, USA; Nov. 15, 2015-Nov. 22, 2015, Nov. 15, 2015 (Nov. 15, 2015).
Yang, PCT International Search Report, International application No. PCT/US2017/024136, European Patent Office, P.B. 5818 Patentlaan 2 NL—2280 HV Rijswijk, dated Jun. 8, 2017.
NSN et al: "UL power control and power headroom reporting for dual connectivity", 3GPP Draft; R1-141536 DC and UL PC PHR, 3rd Generation Prtnership Project (3GPP), Mobile Competence Cenre; 650, Route Des Lucioles; F-06921 Sophia-Antipolis Cedex; France, vol. RAN WG1, No. Shenzhen, China; Mar. 31, 2014-Apr. 4, 2014, Mar. 30, 2014 (Mar. 30. 2014).
Tejera, PCT International Search Report, International application No. PCT/US2017/024143, European Patent Office, P.B. 5818 Patentlaan 2 NL—2280 HV Rijswijk, dated Jun. 16, 2017.
NTT Docomo et al: "Discussions on TTI shortening", 3GPP Draft; R1-160966, 3rd Generation Prtnership Project (3GPP), vol. RAN WG1, No. St Julian's, Malta; Feb. 15, 2016-Feb. 19, 2016, Feb. 14, 2016 (Feb. 14, 2014).
Wu, Notice of Reference Cited, PTO-892, U.S. Appl. No. 15/262,359, U.S. Patent Trademark Office, dated Mar. 13, 2018.
Ho, PTO-892, Notice of Reference cited, U.S. Appl. No. 15/262,466, U.S. Patent and Trademark Office, dated Feb. 8, 2018.
Wu, Notice of References Cited, PTO-892, U.S. Appl. No. 15/262,389, U.S. Patent and Trademark Office, datd Mar. 13, 2018.
Ho, PTO-892, Notice of References Cited, U.S. Appl. No. 15/262,441, U.S. Patent and Trademark Office, dated Jan. 25, 2018.

* cited by examiner

METHOD AND APPARATUS FOR SCHEDULING UPLINK TRANSMISSIONS WITH REDUCED LATENCY

CROSS-REFERENCE TO RELATED APPLICATIONS

This application claims priority to a provisional application entitled "Method and Apparatus for Scheduling Uplink Transmissions with Reduced Latency," U.S. Provisional Application No. 62/317,149, filed on Apr. 1, 2016; and is related to an application entitled "Method and Apparatus for Scheduling Uplink Transmissions with Reduced Latency," U.S. application Ser. No. 15/262,389, an application entitled "Method and Apparatus for Scheduling Uplink Transmissions with Reduced Latency," U.S. application Ser. No. 15/262,421, an application entitled "Method and Apparatus for Scheduling Uplink Transmissions with Reduced Latency," U.S. application Ser. No. 15/262,441, an application entitled "Method and Apparatus for Scheduling Uplink Transmissions with Reduced Latency," U.S. application Ser. No. 15/262,466, and an application entitled "Method and Apparatus for Scheduling Uplink Transmissions with Reduced Latency," U.S. application Ser. No. 15/262,359, all filed on even date herewith and commonly assigned to the assignee of the present application, which are hereby incorporated by reference.

BACKGROUND

1. Field

The present disclosure is directed to a method and apparatus for scheduling uplink transmissions with reduced latency. More particularly, the present disclosure is directed to wireless communication device transmissions using a shortened transmit time interval.

2. Introduction

Presently, In Long Term Evolution (LTE) communication systems, time-frequency resources are divided into subframes where each 1 ms subframe has two 0.5 ms slots and each slot has seven Single Carrier Frequency Division Multiple Access (SC-FDMA) symbols in the time domain for uplink transmissions. In the frequency domain, resources within a slot are divided into Physical Resource Blocks (PRBs), where each resource block spans 12 subcarriers.

In current LTE systems, User Equipment (UE) uplink data is scheduled using a 1 ms minimum Transmission Time Interval (TTI). Within each scheduled TTI, the UE transmits data over a Physical Uplink Shared CHannel (PUSCH) in PRB-pairs indicated by an uplink grant that schedules the data transmission to the UE. Each PRB-pair comprises two PRBs, with one PRB in each slot. For FDD systems, if an uplink grant is received in subframe n, the UE transmits PUSCH in subframe n+4 in response to the grant and looks for an ACK/NACK corresponding to that transmission in subframe n+8. If a NACK is indicated, the UE will retransmit in subframe n+12 resulting in a HARQ round trip delay of 8 ms. TDD systems typically have a similar or longer round trip delay. This causes latency that delays transmission and reception of communication signals.

Thus, there is a need for a method and apparatus for scheduling uplink transmissions with reduced latency.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for scheduling uplink transmissions with reduced latency. According to a possible embodiment, a number of symbols used for UL transmissions in a TTI can be compared to a threshold value of symbols. An indication can be sent from a device on a sidelink channel. The indication can indicate the location of symbols used for an UL transmission when the UL transmission occupies a number of symbols less than the threshold value. Both a sidelink transmission and the UL transmission can be transmitted in the TTI when the UL transmission occupies the number of symbols less than the threshold value. Only the UL transmission can be transmitted in the TTI when the UL signal occupies a number of symbols that are at least the threshold value.

Figure 1:
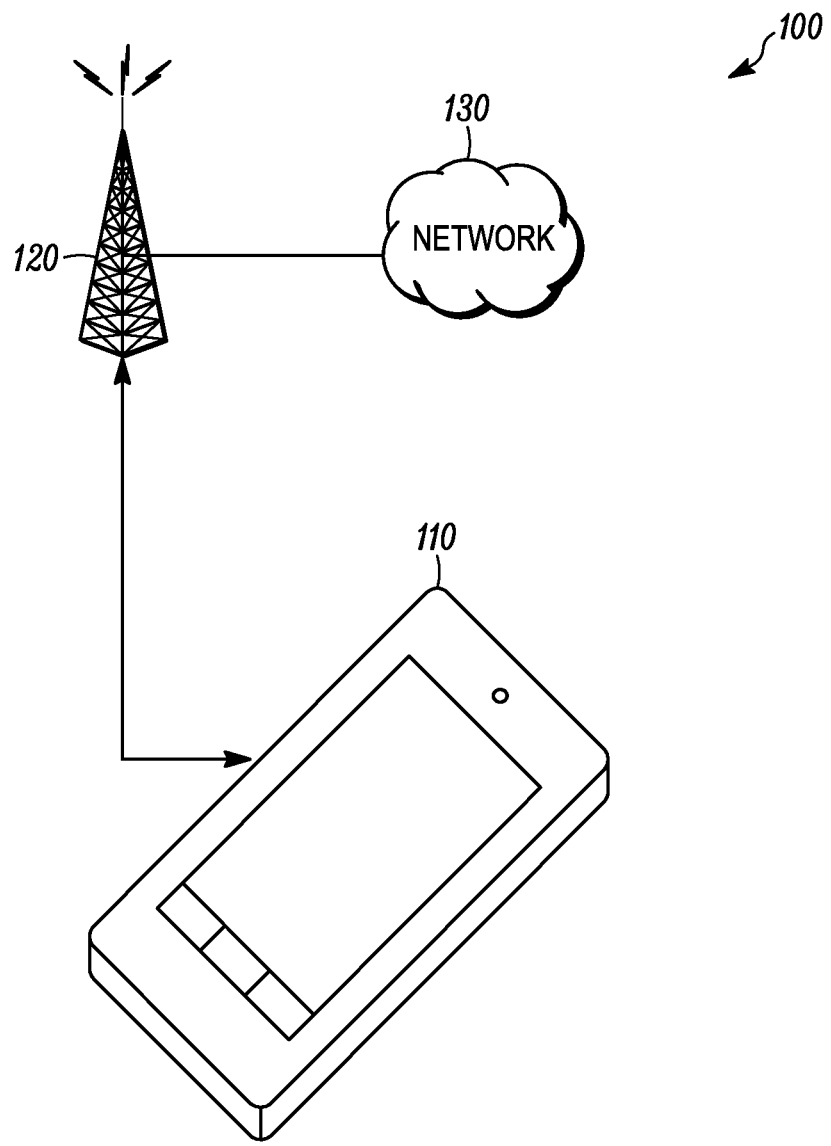
FIG. 1 is an example illustration of a system according to a possible embodiment.

FIG. 1 is an example illustration of a system 100 according to a possible embodiment. The system 100 can include a wireless communication device 110, a base station 120, and a network 130. The wireless communication device 110 can be a User Equipment (UE), such as a wireless terminal, a portable wireless communication device, a smartphone, a cellular telephone, a flip phone, a personal digital assistant, a device having a subscriber identity module, a personal computer, a selective call receiver, a tablet computer, a laptop computer, or any other device that is capable of sending and receiving communication signals on a wireless network. The base station 120 can be an enhanced NodeB, an access point, another device, or any other element that can provide access between a wireless communication device and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a high altitude platform network, and/or other WWAN communications networks.

In operation, transmission of UE data using shorter minimum Transmit Time Interval (TTI), such as shorter than 1 ms, can be used to reduce latency in LTE systems. A shorter minimum TTI (sTTI) can allow the UE to send data using reduced latency when compared to current LTE systems. For example, scheduling UE transmission over a sTTI length of 0.5 ms, such as a shortened Physical Uplink Shared Channel (shortened PUSCH or sPUSCH) scheduled using a Physical Resource Block (PRB) spanning a 0.5 ms in a 1 ms subframe, or scheduling UE transmission over a sTTI length of ~140 us, such as an sPUSCH, scheduled using a shortened Physical Resource Block (PRB) spanning two Single Carrier Frequency Division Multiple Access (SC-FDMA) symbols within a slot in a subframe may not only reduce time taken to transmit a data packet, but also reduce the round trip time for possible Hybrid Automatic Repeat reQuest (HARQ) retransmissions related to that data packet. Disclosed embodiments can enable UE transmission with shortened TTI.

UE transmissions can be either received by one or more base stations, such as eNBs, or other UEs in the communication network. When UE transmissions are received by other UEs, the transmissions can also be referred to as sidelink transmissions.

For configuration of sTTI operation, sTTI transmissions, such as transmissions based on a shortened minimum TTI length, can be supported using at least one of two approaches. For a first approach for supporting sTTI transmissions, a UE can be configured by higher layers, such as a Radio Resource Control (RRC) layer, a Medium Access Control (MAC) layer, or other higher layers, to operate in a sTTI mode. The configuration can indicate a particular sTTI length. Once configured, the UE can expect to receive Uplink (UL) grants for only sTTI transmissions and UE transmissions can be made based on the configured sTTI length in response to the grants.

For a second approach for supporting sTTI transmissions, a UE can be configured by higher layers to operate in a sTTI mode. The configuration can indicate a particular sTTI length. Once configured, in addition to receiving grants scheduling UL transmissions with regular TTI (rTTI) length, such as the TTI length used in current LTE systems, the UE can also be expected to receive grants that schedule UL transmissions with the configured sTTI length. As an example of TTI length in current LTE systems, a PUSCH/ transmission and associated Demodulation Reference Signal (DMRS) can continuously span either the first 13 SC-FDMA symbols or all the SC-FDMA symbols of a subframe. Such transmissions can be generally referred to as 1 ms TTI transmissions or regular TTI transmissions.

The second approach can be more flexible when compared to the simpler first approach. While sTTI transmissions help in reducing latency, they also may require more control signaling and pilot overhead when compared to regular 1 ms TTI transmissions. The second approach can provide more options for the network to trade-off latency vs. control signaling/pilot overhead. In the above two approaches, the network can decide when to configure a UE with sTTI mode based on receiving an indication from the UE. The indication can be for example a Scheduling Request (SR) associated with sTTI operation or a Buffer Status Report (BSR) indicating that there is data in UE buffer that needs sTTI operation. According to a possible implementation, when a MAC layer is used for configuration of a short TTI, the configuration signaling can be sent in the form of a sTTI activation/deactivation MAC Control Element (MAC CE).

If the UE has data to transmit, it can request for UL transmission resources, such as ask the network to send an UL grant, using at least three different methods. One method of requesting an UL grant is a Scheduling Request (SR) based method. In this method, a UE can be configured by the network with a set of physical layer SR resources. When the UE has data to send, it can send a transmission on a SR resource, in response to which the network can send a grant to the UE. Each SR resource can be a Physical Uplink Control Channel (PUCCH) resource that is mapped to a pair of PRBs in a 1 ms subframe with each PRB occupying a 0.5 ms slot within the 1 ms subframe. The SR resource can occur in multiple subframes where the set of SR resources can include the SR resources in all the possible subframes. The subframes in which the SR resource can occur can be configured by higher layers.

Another method for requesting an UL grant can be a RACH based method. In this method, if an SR resource is not configured for a UE, the UE can initiate a random access procedure by transmitting using the Physical Random Access Channel (PRACH).

Another method for requesting an UL grant is a Buffer Status Report (BSR) based method. In this method, the UE can indicate the amount of outstanding data that it has to transmit using a Medium Access Control (MAC) layer message called BSR. The BSR can be carried on the physical layer using PUSCH. The PUSCH can be transmitted using one or more PRB-pairs in a subframe, with each PRB-par including two PRBs, where each PRB can be transmitted in each 0.5 ms slot of the subframe.

To transmit data using a sTTI instead of regular TTI, the UE can request a grant for sTTI transmission. One or more of the following methods can be used to enable data transmission using sTTI operation. One method of enabling transmitting data using an sTTI is by using different SR resources for requesting regular and sTTI transmissions. In this method, the UE can be configured with two different sets of SR resources. The first set of SR resources can be used by the UE to indicate to the network that it has data to transmit that can be scheduled using regular TTI transmission. The second set of SR resources can be used by the UE indicate to the network that it has data to transmit that needs sTTI transmission for lower latency.

The second set of SR resources can be transmitted over a physical channel that spans a time duration that is <=0.5 ms. Each SR resource of the second set can be a shortened PUCCH resource (sPUCCH). Alternatively, each SR resource of the second set can be a shortened PUSCH (sPUSCH) resource. For this option, the UE can optionally transmit a buffer status report (BSR) on the SR resource.

Alternatively, each SR resource of the second set can include a Sounding Reference Signal (SRS) resource. Alternatively, each SR resource of the second set can include a demodulation reference signal (DMRS) resource.

The SR resource of the second set can be mapped to a single PRB in a 0.5 ms slot of a subframe. Alternatively, the SR resource can be mapped to one of 1/2/3/4 SC-FDMA symbols of a subframe and span the entire transmission bandwidth configuration, or a subset of PRBs within the transmission bandwidth configuration. The UE may transmit a BSR indicating presence of low latency or critical data in its buffer in the second set of SR resources. The BSR can also indicate the buffer size of outstanding low latency/critical data in the UE buffer. The second set of SR resources can be configured to occur more frequently than the first set of SR resources.

For the case where second set of resources includes a PUCCH resource, the UE can use a first PUCCH resource from a first higher layer configured set of PUCCH resources to transmit SR for indicating the network that it has data to transmit that can be scheduled using regular TTI transmission; and use a second PUCCH resource from a second higher layer configured set of PUCCH resources to transmit SR for indicating the network that it has data to transmit that can be scheduled using sTTI transmission. The UE typically can also use PUCCH resources to transmit HARQ-ACK in response to DL data, using a PUCCH resource that can be determined based on the Control Channel Element (CCE) index of the control channel that schedules the DL data transmission. If the UE has to transmit HARQ-ACK in a subframe and also has a pending SR for requesting a regular TTI transmission, the UE can use the PUCCH resource from the first higher layer configured set of PUCCH resources in that subframe instead of the PUCCH resource determined from CCE index to transmit HARQ-ACK. If the UE has to transmit HARQ-ACK in a subframe and also has a pending SR for requesting a sTTI transmission or has pending requests for both regular TTI transmission and sTTI transmission, the UE can use the PUCCH resource from the second higher layer configured set of PUCCH resources in that subframe instead of the PUCCH resource determined from CCE index to transmit HARQ-ACK. In one example, the first PUCCH resource can span a first number of symbols (e.g. 14 symbols) while the second PUCCH resource can span a second number of symbols that is smaller than the first number (e.g. 7 symbols). In another example, both first and second PUCCH resources can span the same number of symbols.

For the case where each SR resource of the second set of SR resources is a Sounding Reference Signal (SRS) resource, the UE can be configured to transmit on a regular SRS resource, such as a resource on which the UE transmits for channel sounding purposes, and a SR specific-SRS resource, such as a resource configured for SR transmission on which the UE transmits for requesting UL transmission resources, such as requesting an UL grant. If both the regular SRS resource and SR-specific SRS resource occur in the same SC-FDMA symbol and the UE needs send a SR, the UE can transmit on the SR-specific SRS resource and drop the transmission on the regular SRS resource. If the UE does not need to send the SR, the UE can transmit on its regular SRS resource.

For the case where each SR resource of the second set of SR resources is a DMRS resource, the UE can transmit DMRS using a predefined/preconfigured DMRS cyclic shift value to indicate presence of a SR request.

Another method of enabling transmitting data using an sTTI is by using different PRACH resources for requesting regular and sTTI transmissions. With this method, the UE can be configured with two different sets PRACH resources when the UE is configured in sTTI operation mode. The second set of PRACH resource can occur more frequently in time than the first set. The UE may transmit a RACH preamble using the second set of PRACH resources only if it has reduced latency data to transmit, and use the first set of RACH resources otherwise. When using the second set of RACH resources the UE can use a shorter RACH preamble, such as a preamble of smaller time duration where one example is PRACH format 4, when compared to the preamble used for transmission using first set of PRACH resources.

Another method of enabling transmitting data using an sTTI is by using a modified BSR. In this method, the UE can send a modified BSR that can be modified when compared to BSR sent by legacy LTE UEs and when compared to a UE not configured with sTTI mode. Bits in the modified BSR can indicate that the UE has outstanding data that it needs to transmit with reduced latency. In response to modified BSR, the network can send an UL grant scheduling UL sTTI resources to the UE. The modified BSR can include additional bit(s) indicating presence of critical or low latency data in UE buffer based on which the network can send an UL grant scheduling sTTI resources. For example, a BSR with the bit set to '1', can indicate presence of critical or low latency data where a sTTI grant is needed and a BSR without the additional bit(s) or a BSR with the bit set to '0', can indicate that a sTTI grant is not needed. In current LTE systems, buffer status can be indicated for 4 different Logical Channel Groups (LCGs). The number of LCGs can be extended for UEs configured with sTTI operation. For example, a UE can be allowed to report a buffer status of 5 or more LCGs. The UE can report BSR with LCG ID>=4 to indicate presence of low latency/critical data that needs sTTI based transmission. The modified BSR may be configured by higher layers, such as RRC, with different BSR parameters, such as retxBSR-Timer. As an example, the same retxBSR-Timer value can be set by higher layers for both regular and low-latency data, but it can be indicated in a TTI and not in a subframe. In this case a single indication can serve the purpose, such as an indication of retxBSR-Timer=2 that means 2 subframes for regular data and 2 sTTI for low-latency data. For regular and periodic BSR, if more than one LCG has data available for transmission in the TTI where the BSR is transmitted, a long BSR can be reported if the long BSR can be transmitted in the TTI. Otherwise, a short BSR can be reported. If the UE is configured with sTTI and a delay-tolerant packet comes the sTTI resource may or may not be used to transmit the BSR for delay-tolerant data depending on the configuration done by higher layer signaling. The modified BSR can include bits indicating a TTI length value that is suitable for transmitting data in the UE buffer.

The Downlink Control Information format (DCI format) used for UL grants scheduling sPUSCH transmissions can be different from the DCI format used for UL grants scheduling regular 1 ms TTI PUSCH transmissions. A UE configured for sTTI operation mode can be configured to monitor UL grants assuming a first DCI format, such as DCI format 0 used in current LTE systems, and assuming a second DCI format, such as a new DCI format S0 for scheduling sPUSCH. If the UE detects UL grant with the first DCI format, it can transmit PUSCH in response to the grant. If the UE detects an UL grant with second DCI format, it can transmit sPUSCH in response to the grant. The grant with the second DCI format can also optionally indicate sTTI length. The sTTI length can be indicated in number of SC-FDMA symbols. Alternately, the grant with the second DCI format can indicate the number of consecutive sTTIs assigned to the UE. In some cases, the assigned sTTIs can be present in more than one subframe.

The sTTI length for UL and DL can be the same. Alternately, they can be different. For example, the UE can be configured with one OFDM symbol Downlink (DL) sTTI and one slot (or 7 SC-FDMA symbols) UL sTTI for coverage reasons. In such a scenario, each DL subframe can have 14 DL sTTIs, while each UL subframe can have two UL sTTIs. One option can be to identify sTTIs based on subframe index and sTTI index pairs where (n,x) represents TTI x (or sTTI x) within subframe n. DL sTTIs within a given subframe can be ordered using 0, 1, 2, ..., Nsttid-1, where Nsttid can be the maximum number of possible DL sTTI durations within a subframe duration. Similarly, UL sTTIs within a given subframe can be ordered using 0, 1, 2, ..., Nsttiu-1, where Nsttiu can be the maximum number of possible UL sTTI durations within a subframe duration. The timing relationship between UL grant reception and UL transmission can be defined after taking into account minimum processing time (Tp) required for the UE to prepare UL transmission after receiving the grant.

For example, assume Tp=0.5 ms, Nsttid=14 (DL sTTI length=1 OFDM symbol), Nsttiu=2 (UL sTTI length=7 SC-FDMA symbols). Then, for a grant received in DL sTTI (n,0), such as DL sTTI 0 in subframe n, the corresponding UL transmission can occur in UL sTTI (n,1), such as UL sTTI 1 in subframe n. Similarly, for grant(s) received in DL sTTIs (n,1), (n,2) ... (n,6), the corresponding UL transmission can occur in UL sTTI (n,1), such as the first available uplink sTTI after taking into account processing time Tp; and similarly for grant(s) received in DL sTTIs (n,7), (n,8) ... (n,13), the corresponding UL transmission can occur in UL sTTI (n+1,0).

For a system where UL sTTI length is smaller than DL sTTI length, a sTTI index parameter can be signaled in the grant to identify the specific UL sTTI for which the grant applies. The sTTI index parameter can identify the sTTI index within a subframe using the approach described in the above two paragraphs. For example, assume Tp=0.5 ms, Nsttid=2 (DL sTTI length=7 OFDM symbols) and Nsttiu=14 (UL sTTI length=1 SC-FDMA symbol). For this case, an UL grant transmitted in DL sTTI (n,0), can be used for scheduling UL transmission in one or more of sTTIs (n+1,0) (i.e., subframe n+1 and sTTI index 0), (n+1,1) (i.e., subframe n+1 and sTTI index 1), ... (n+1,6) (i.e., subframe n+1 and sTTI index 1) and an UL grant transmitted in DL sTTI (n,1) can be used for scheduling UL transmission in one or more of sTTIs (n+1,7), (n+1,1), ... (n+1,13). Given this, in addition to the implicit timing based on processing time, the specific UL sTTI within set of schedulable sTTIs (e.g. sTTIs within a given subframe) can be indicated to the UE using bits in the UL grant. When cross-carrier scheduling is used, the TTI length for UL and DL can be different. For example, a first component carrier (CC) can have DL sTTI=0.5 ms and a second CC can have UL sTTI=1 SC-FDMA symbol.

Figure 2:
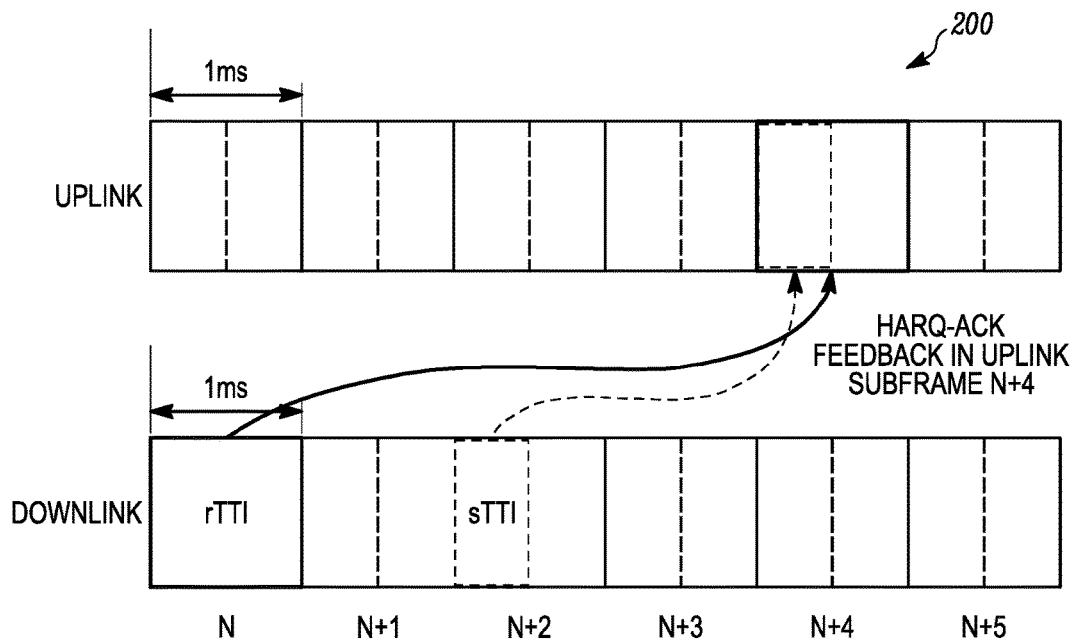
FIG. 2 is an example illustration of subframes showing HARQ-ACK feedback in uplink subframe n+4 for downlink rTTI in DL subframe n and for downlink sTTI in DL subframe n+2 according to a possible embodiment.

FIG. 2 is an example illustration 200 of subframes showing Hybrid Automatic Repeat reQuest-Acknowledgement (HARQ-ACK) feedback in uplink subframe n+4 for downlink rTTI in DL subframe n and for downlink sTTI in DL subframe n+2 according to a possible embodiment. The HARQ feedback on UL in response to DL data transmission on a sTTI that is smaller than the legacy 1 ms TTI subframe operation can be enhanced to support reduced latency. HARQ-ACK can denote the ACK/NACK/DTX response for a transport block or Semi-Persistent Scheduling (SPS) release Physical Downlink Control Channel/Enhanced Physical Downlink Control Channel (PDCCH/EPDCCH) associated with a serving cell. Additional enhancements can also be used for Channel State Information (CSI) feedback.

In this first case, a UE may be configured with both regular/legacy 1 ms TTI subframe, rTTI, and a shorter TTI, sTTI, for reduced latency. Within an UL subframe, the UE may need to transmit HARQ-ACK feedback corresponding to PDSCH transmission on both rTTI and sTTI. For reduced latency, a shorter TTI for conveying at least the HARQ-ACK feedback for sTTI may be preferable compared to 1 ms legacy TTI used for HARQ-ACK transmission for rTTI. For example, the HARQ-ACK PUCCH sTTI may be a slot duration, such as 0.5 ms.

Figure 3:
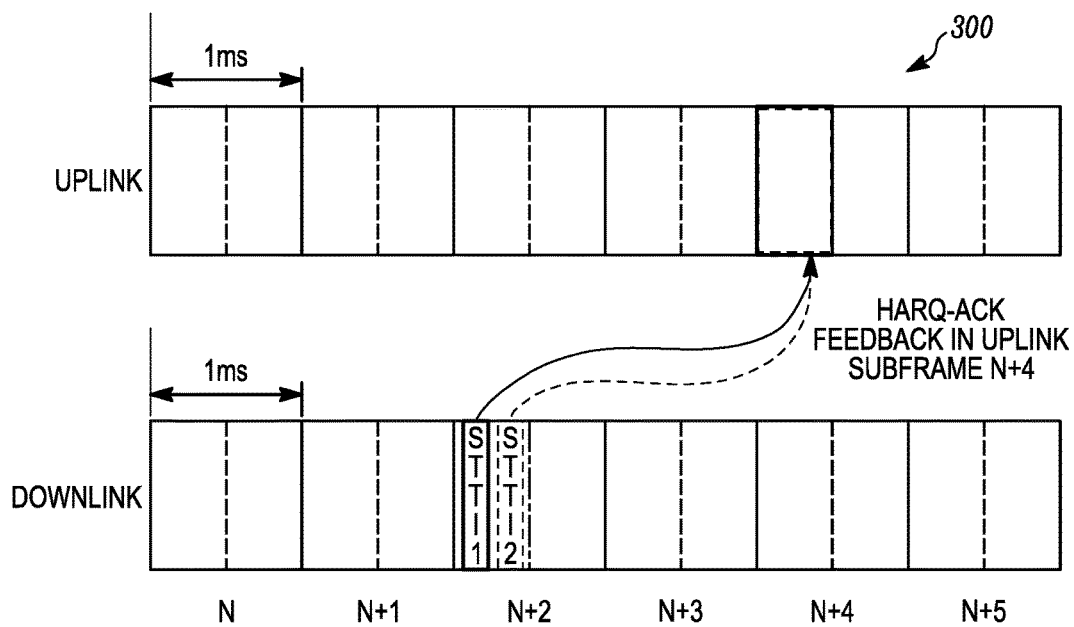
FIG. 3 is an example illustration of HARQ-ACK feedback in uplink subframe n+4 for downlink sTTI-1 in DL subframe n+2 and sTTI-2 in DL subframe n+2 according to a possible embodiment.

FIG. 3 is an example illustration 300 of HARQ-ACK feedback in uplink subframe n+4 for downlink sTTI-1 in DL subframe n+2 and sTTI-2 in DL subframe n+2 according to a possible embodiment. In this second case, a UE may be configured with only sTTI, with downlink sTTI being shorter, such as ¼ slot, than the uplink TTI PUCCH for HARQ-ACK transmission. In this case, the UE can transmit HARQ-ACK feedback corresponding to multiple sTTIs within a single uplink PUCCH TTI. The uplink PUCCH sTTI may be shorter than a legacy TTI size of a 1 ms subframe, for example, a PUCCH sTTI can be a slot duration.

Figure 4:
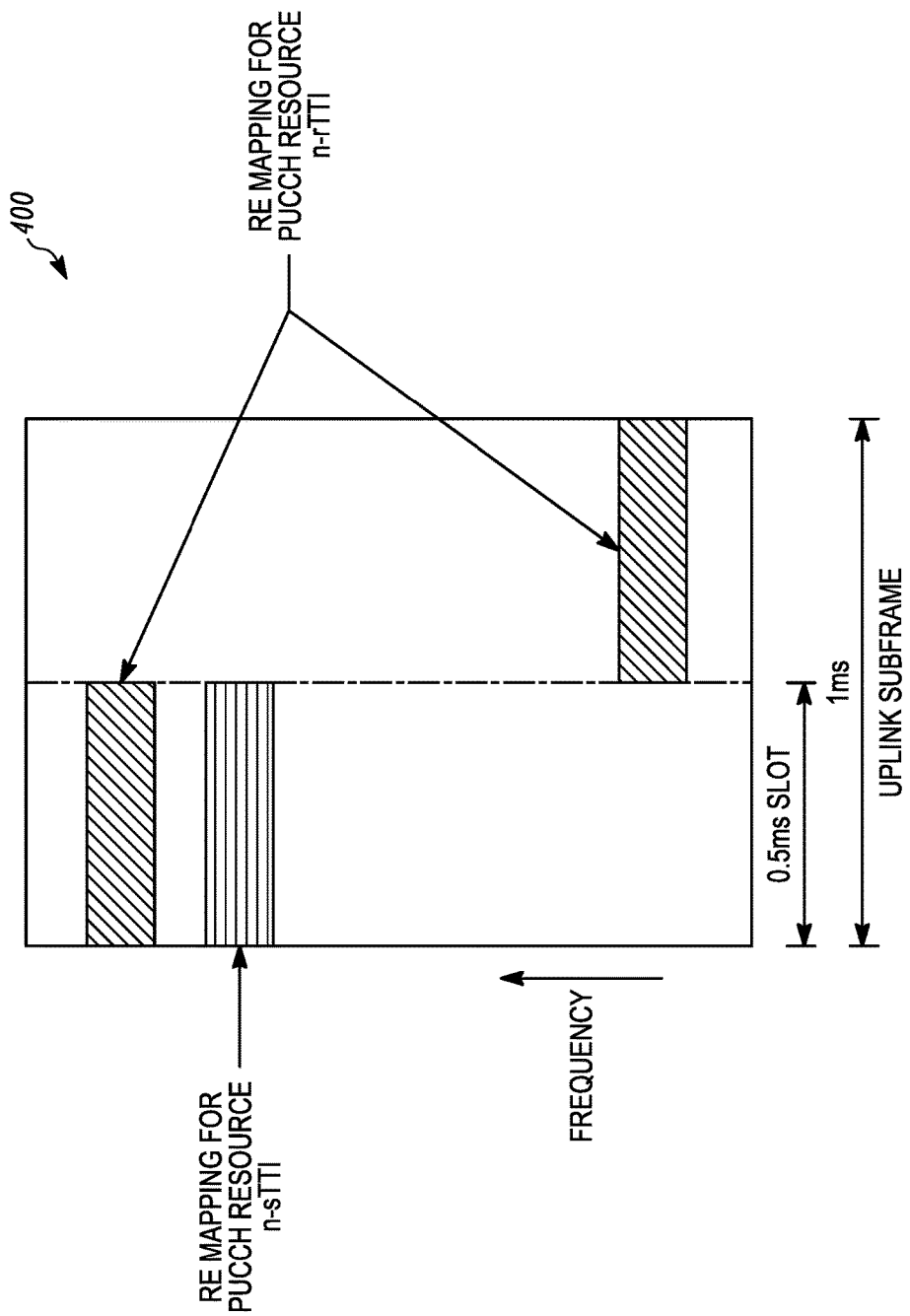
FIG. 4 is an example illustration of a subframe showing an example of PUCCH resource mapping for the first case with rTTI and sTTI according to a possible embodiment.
Figure 5:
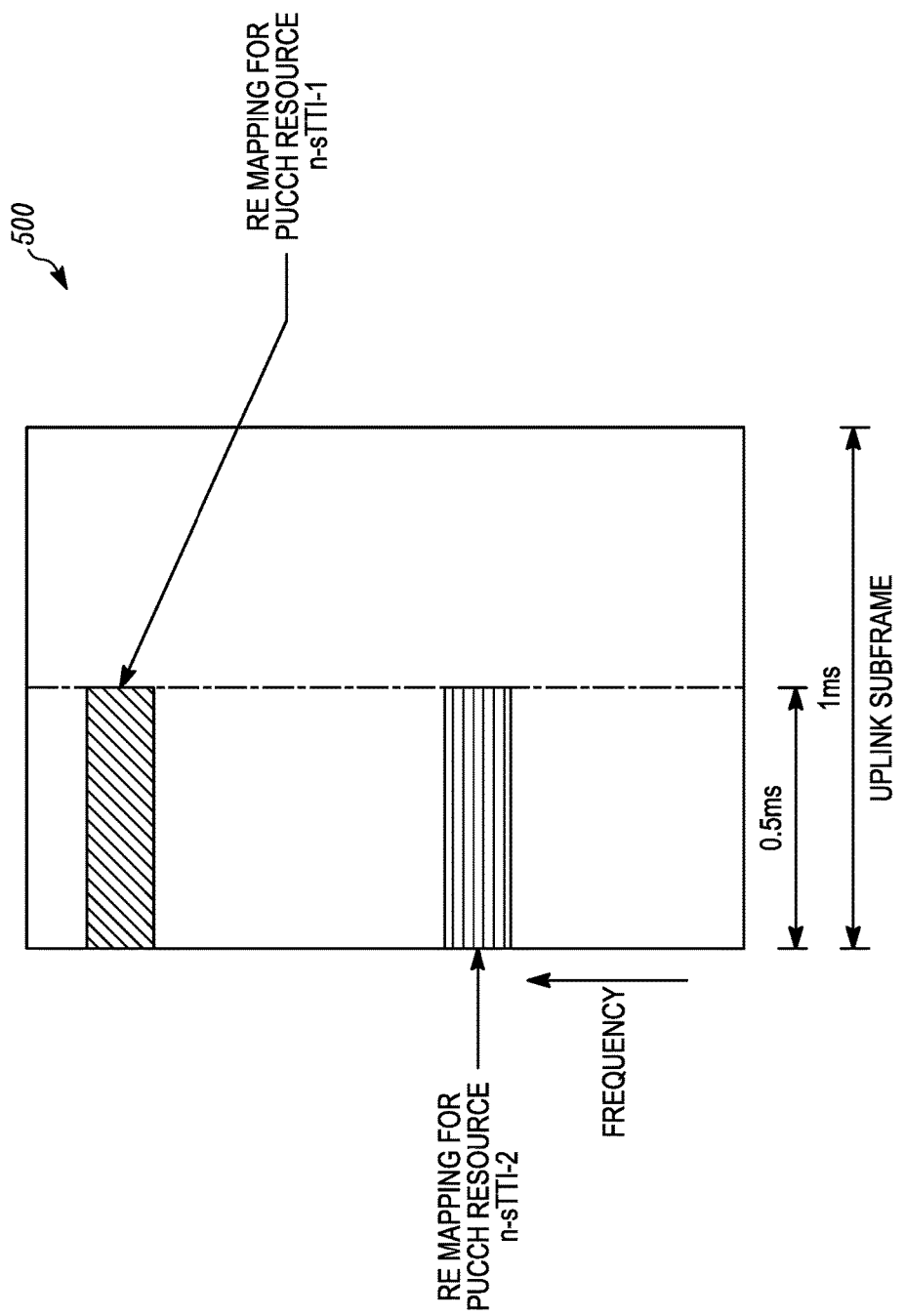
FIG. 5 is an example illustration of a subframe showing an example of PUCCH resource mapping for the second case with sTTI-1 and sTTI-2 according to a possible embodiment.

FIG. 4 is an example illustration of a subframe 400 showing an example of PUCCH resource mapping for the first case with rTTI and sTTI according to a possible embodiment. FIG. 5 is an example illustration of a subframe 500 showing an example of PUCCH resource mapping for the second case with sTTI-1 and sTTI-2 according to a possible embodiment. For a combination of the above two cases, mechanisms for transmission of HARQ-ACK feedback for multiple TTIs with one uplink PUCCH TTI can be used.

For example, a UE can determine a PUCCH resource (n-rTTI) corresponding to PDSCH transmission or downlink SPS release associated with a legacy 1 ms TTI subframe, rTTI, if rTTI is configured. The UE can determine a PUCCH resource (n-sTTI) corresponding to PDSCH transmission or downlink SPS release associated with a shorter TTI, sTTI. The determination of the n-sTTI PUCCH resource may be implicit, such as based on the DL assignment message for the PDSCH, such as the location and/or type of DCI, and/or type of downlink control channel and/or resource indicator in the DCI. The determination of the n-sTTI PUCCH resource may also be explicitly configured by higher layer configuration. In one alternative, the Transmit Power Control (TPC) field in the DCI can be used to convey the resource indicator indicating the PUCCH resource. One of the TPC bits or states of the TPC field or another field in the DCI may also be used to indicate the presence of another TTI HARQ-ACK feedback, such as TTI assignment indicator or counter, in the same uplink subframe/slot comprising the sTTI HARQ-ACK feedback.

The mapping of the n-sTTI PUCCH resource onto physical resource blocks may be similar to n-rTTI, which maps to each of the two slots in an uplink subframe. This may require the eNB to configure additional PUCCH resources, such as different PUCCH resource offsets and/or different PUCCH resource blocks, corresponding to the multiple sTTI for which HARQ-ACK feedback should to be carried in the subframe, and thereby increase uplink overhead. Using two-slot spanning n-sTTI PUCCH resource mapping may also increase the latency for sTTI transmissions. Alternatively, to reduce uplink overhead and latency, a shorter transmission duration can be used for n-sTTI, such as one slot PUCCH duration, where PDSCH transmissions received on a sTTI within a first slot of a downlink subframe (n) can have a corresponding PUCCH resource only in the first slot of the uplink subframe (n+k), where can be the HARQ-ACK feedback delay based on UE processing time, preparation of HARQ-ACK uplink, and/or uplink timing advance. PDSCH transmissions received on a sTTI within a second slot of a downlink subframe can have a corresponding PUCCH resource only in the second slot of the uplink subframe. The downlink sTTI can be a slot duration or a fraction of a slot duration. If the UE receives PDSCH transmission on only rTTI or sTTI, HARQ-ACK can be transmitted on the corresponding PUCCH resource n-rTTI or n-sTTI respectively.

Different options can be used for HARQ-ACK feedback when UE may be required to transmit HARQ-ACK in same uplink subframe corresponding to PDSCH transmission on multiple TTIs, such as rTTI and sTTI, first sTTI (sTTI-1) and second sTTI (sTTI-2), HARQ-ACK feedback for multiple TTIs overlapping within a subframe. The description below can be for the first case of rTTI and sTTI HARQ-ACK feedback but can be extended for other cases, such as the second case with sTTI-1 and sTTI-2.

A first option can be to use multi-PUCCH resource transmission where HARQ-ACK corresponding to rTTI is transmitted on the n-rTTI PUCCH resource and HARQ-ACK corresponding to sTTI is transmitted on the n-sTTI PUCCH resource. Due to multi-PUCCH resource transmission, the Cubic Metric (CM) of the waveform can increase, resulting in a larger Power Amplifier (PA) back-off used and corresponding smaller uplink control channel coverage compared to a legacy single PUCCH resource transmission.

A second option can be to use larger payload PUCCH where the HARQ-ACK bits corresponding to rTTI and sTTI are concatenated, coded, and transmitted on the n-rTTI PUCCH resource. In one alternative, HARQ-ACK for both rTTI and sTTI can be transmitted only in the slot with both n-rTTI and n-sTTI PUCCH resource, in the other slot HARQ-ACK can be only transmitted for rTTI on the n-rTTI PUCCH resource. Spatial bundling, such as "AND" operation between the HARQ-ACK bits in case of multiple transport block reception, can be used to reduce the payload size for sTTI and/or rTTI.

A third option can be to use PUCCH resource/channel selection where in the slot with the overlapping PUCCH resource, such as the n-sTTI PUCCH resource, 1-bit associated with HARQ-ACK, with or without spatial bundling of HARQ-ACK can be encoded via selecting between the n-rTTI PUCCH resource and the n-sTTI PUCCH resource. In the other slot, n-rTTI PUCCH resource can be used to transmit the HARQ-ACK corresponding to the rTTI. In case where HARQ-ACK response corresponding to another sTTI may need to be transmitted on the other slot, PUCCH resource selection can be used on the other slot as well. The PUCCH resource selection is described in the tables below for the case of HARQ-ACK feedback for two TTIs (xTTI, yTTI) on a serving cell.

In the third option, a UE configured with a transmission mode that supports up to two transport blocks on a TTI type (rTTI or sTTI) can use the same HARQ-ACK response for both the transport blocks in response to a PDSCH transmission with a single transport block or a PDCCH/EPDCCH indicating downlink SPS release associated with the TTI type. The transmission mode for rTTI and sTTI may be different. In the case of a transmission mode that supports up to two transport blocks, such as Multiple Input Multiple Output (MIMO), on both TTIs, HARQ-ACK feedback corresponding to one of the two TTIs can be spatially bundled, such as the case for A=3-1 in the tables below. The xTTI can be one value from the two TTI set {rTTI, sTTI} or {sTTI-1, sTTI-2}. The yTTI can be the other TTI. In one example, xTTI=rTTI, yTTI=sTTI, and can be fixed in the specification.

In one alternative, the value of xTTI and yTTI can be based on the TTI assignment indicator and possibly the mapped sTTI PUCCH resource slot index. For the two TTIs {rTTI, sTTI}, if the TTI assignment indicator is 'set' and the UE has missed the TTI assignment message corresponding to rTTI, xTTI=sTTI, and yTTI=rTTI can be used. The UE can transmit HARQ-ACK on the sTTI PUCCH resource (n-sTTI) assuming rTTI was not assigned. The eNB can detect the missed rTTI assignment due to no transmission on the rTTI PUCCH resource in the other slot. The eNB can use the decision on the missed assignment to interpret the bits on the sTTI PUCCH resource, resulting in some potential delay if sTTI PUCCH resource is in the first slot of the uplink subframe. An option can be to use xTTI=sTTI, and yTTI=rTTI if the sTTI PUCCH resource is in the second slot and transmit HARQ-ACK assuming rTTI was not assigned, use xTTI=rTTI, and yTTI=sTTI if the sTTI PUCCH resource is in the first slot, and transmit HARQ-ACK according to the tables below where no transmission on n-sTTI PUCCH resource is used to indicate NACK for yTTI and Discontinuous Transmission (DTX) for xTTI.

For the two TTIs {sTTI-1, sTTI-2}, if the TTI assignment indicator is 'set' and the UE has missed the TTI assignment message corresponding to sTTI-1, xTTI=sTTI-1 and yTTI=sTTI-2 can be used and HARQ-ACK can be transmitted according to the tables below where no transmission on n-sTTI-1 PUCCH resource can be used to indicate NACK for yTTI and DTX for xTTI. If the TTI Assignment Indicator is set and the UE has received the rTTI assignment message, xTTI=rTTI and yTTI=sTTI. HARQ-ACK can be transmitted according to the tables below where sTTI HARQ-ACK feedback is used for resource selection.

Table 1 shows mapping options of Transport Block (TB) and TTI to HARQ-ACK(j) for PUCCH format 1b HARQ-ACK channel selection within a slot according to a possible embodiment.

TABLE 1

| | HARQ-ACK(j) | | | |
|---|---|---|---|---|
| A | HARQ-ACK(0) | HARQ-ACK(1) | HARQ-ACK(2) | HARQ-ACK(3) |
| 2 | TB1 xTTI | TB1 yTTI | NA | NA |
| 3 | TB1 xTTI | TB2 xTTI | TB1 yTTI | NA |
| 3-1 | TB1 xTTI | TB2 xTTI | spatial bundled TB1 + TB2 yTTI | NA |
| 4 | TB1 rTTI | TB2 rTTI | TB1 sTTI | TB2 sTTI |

Table 2 shows a transmission of Format 1b ACK/NACK channel selection for A=2 according to a possible embodiment. For Tables 2 and 3, 'A' denotes the number of HARQ-ACK responses after spatial bundling for 3-1.

TABLE 2

| HARQ-ACK(0) | HARQ-ACK(1) | A/N PUCCH resource | b(0)b(1) |
|---|---|---|---|
| ACK | NACK/DTX | n-xTTI | 1, 1 |
| NACK | NACK/DTX | n-xTTI | 0, 0 |
| ACK | ACK | n-yTTI | 1, 1 |
| NACK/DTX | ACK | n-yTTI | 0, 0 |
| DTX | NACK/DTX | No Transmission | |

Table 3 shows transmission of Format 1b ACK/NACK channel selection for A=3, 3-1 according to a possible embodiment.

TABLE 3

| HARQ-ACK(0) | HARQ-ACK(1) | HARQ-ACK(2) | A/N PUCCH resource | b(0)b(1) |
|---|---|---|---|---|
| ACK | ACK | NACK/DTX | n-xTTI | 1, 1 |
| ACK | NACK | NACK/DTX | n-xTTI | 1, 0 |
| NACK | ACK | NACK/DTX | n-xTTI | 0, 1 |
| NACK | NACK | NACK/DTX | n-xTTI | 0, 0 |
| ACK | ACK | ACK | n-yTTI | 0, 0 |
| ACK | NACK | ACK | n-yTTI | 1, 0 |
| NACK | ACK | ACK | n-yTTI | 0, 1 |
| NACK/DTX | NACK/DTX | ACK | n-yTTI | 1, 1 |
| DTX | DTX | NACK/DTX | No Transmission | |

In one alternative, for transmission mode that supports up to two transport blocks, such as MIMO, two PUCCH resources can be determined (n-xTTI-1, n-xTTI-2). The resource n-xTTI-1 can be determined similar to as described above and the resource n-xTTI-2 can be determined as n-xTTI-2=n-xTTI-1+1. The resource selection tables for A=3 and A=4 are given below. The tables are similar to 2-cell carrier aggregation tables in LTE. For A=3, xTTI is the TTI with transmission mode that supports up to two transport blocks, such as MIMO. PUCCH resource corresponding to a TTI, such as a first PUCCH resource in a case of TTI supporting two TBs, can be used for HARQ-ACK feedback for that TTI if the other TTI is not assigned or not detected, such as to provide fallback. Second PUCCH resource for a TTI supporting two TBs can be used if HARQ-ACK feedback of ACK is to be indicated for TTI supporting 1 TB. A TTI assignment indicator may not be needed as the additional PUCCH resource for two TB TTI can be used to provide fallback in case of missed assignment messages.

Table 4 shows a transmission of Format 1b ACK/NACK channel selection for A=3, two PUCCH resources for two transport block TTI according to a possible embodiment. For Tables 4 and 5, 'A' denotes the number of PUCCH resources.

TABLE 4

| HARQ-ACK(0) | HARQ-ACK(1) | HARQ-ACK(2) | A/N PUCCH resource | b(0)b(1) |
|---|---|---|---|---|
| NACK/DTX | NACK/DTX | ACK | n-yTTI | 1, 1 |
| NACK/DTX | NACK/DTX | NACK | n-yTTI | 0, 0 |
| ACK | ACK | NACK/DTX | n-xTTI-1 | 1, 1 |
| ACK | NACK | NACK/DTX | n-xTTI-1 | 1, 0 |
| NACK | ACK | NACK/DTX | n-xTTI-1 | 0, 1 |
| NACK | NACK | DTX | n-xTTI-1 | 0, 0 |
| ACK | ACK | ACK | n-xTTI-2 | 1, 1 |
| ACK | NACK | ACK | n-xTTI-2 | 1, 0 |
| NACK | ACK | ACK | n-xTTI-2 | 0, 1 |
| DTX | DTX | DTX | No Transmission | |

Table 5 shows transmission of Format 1b ACK/NACK channel selection for A=4, two PUCCH resources for two transport block TTI according to a possible embodiment.

TABLE 5

| HARQ-ACK(0) | HARQ-ACK(1) | HARQ-ACK(2) | HARQ-ACK(3) | A/N PUCCH resource | b(0)b(1) |
|---|---|---|---|---|---|
| NACK/DTX | NACK/DTX | ACK | ACK | n-yTTI-1 | 1, 1 |
| NACK/DTX | NACK/DTX | ACK | NACK | n-yTTI-1 | 1, 0 |
| NACK/DTX | NACK/DTX | NACK | ACK | n-yTTI-1 | 0, 0 |
| NACK | ACK | NACK | ACK | n-yTTI-1 | 0, 1 |
| ACK | ACK | NACK/DTX | NACK/DTX | n-xTTI-1 | 1, 1 |
| ACK | NACK | NACK/DTX | NACK/DTX | n-xTTI-1 | 1, 0 |
| NACK | ACK | NACK/DTX | NACK/DTX | n-xTTI-1 | 0, 1 |
| NACK | NACK | NACK/DTX | NACK/DTX | n-xTTI-1 | 0, 0 |
| NACK | ACK | ACK | NACK | n-xTTI-2 | 0, 0 |
| ACK | ACK | ACK | NACK | n-xTTI-2 | 1, 0 |
| NACK | ACK | ACK | ACK | n-xTTI-2 | 0, 1 |
| ACK | ACK | ACK | ACK | n-xTTI-2 | 1, 1 |
| ACK | ACK | NACK | ACK | n-yTTI-2 | 1, 1 |
| ACK | NACK | NACK | ACK | n-yTTI-2 | 1, 0 |
| ACK | NACK | ACK | ACK | n-yTTI-2 | 0, 0 |
| ACK | NACK | ACK | NACK | n-yTTI-2 | 0, 1 |
| DTX | DTX | NACK/DTX | NACK/DTX | No Transmission | |

For extension to Carrier Aggregation (CA), Larger payload PUCCH or PUCCH resource selection with spatial bundling and/or time-domain bundling or compression can be used, such as similar to current Time Division Duplex (TDD) CA.

Figure 6:
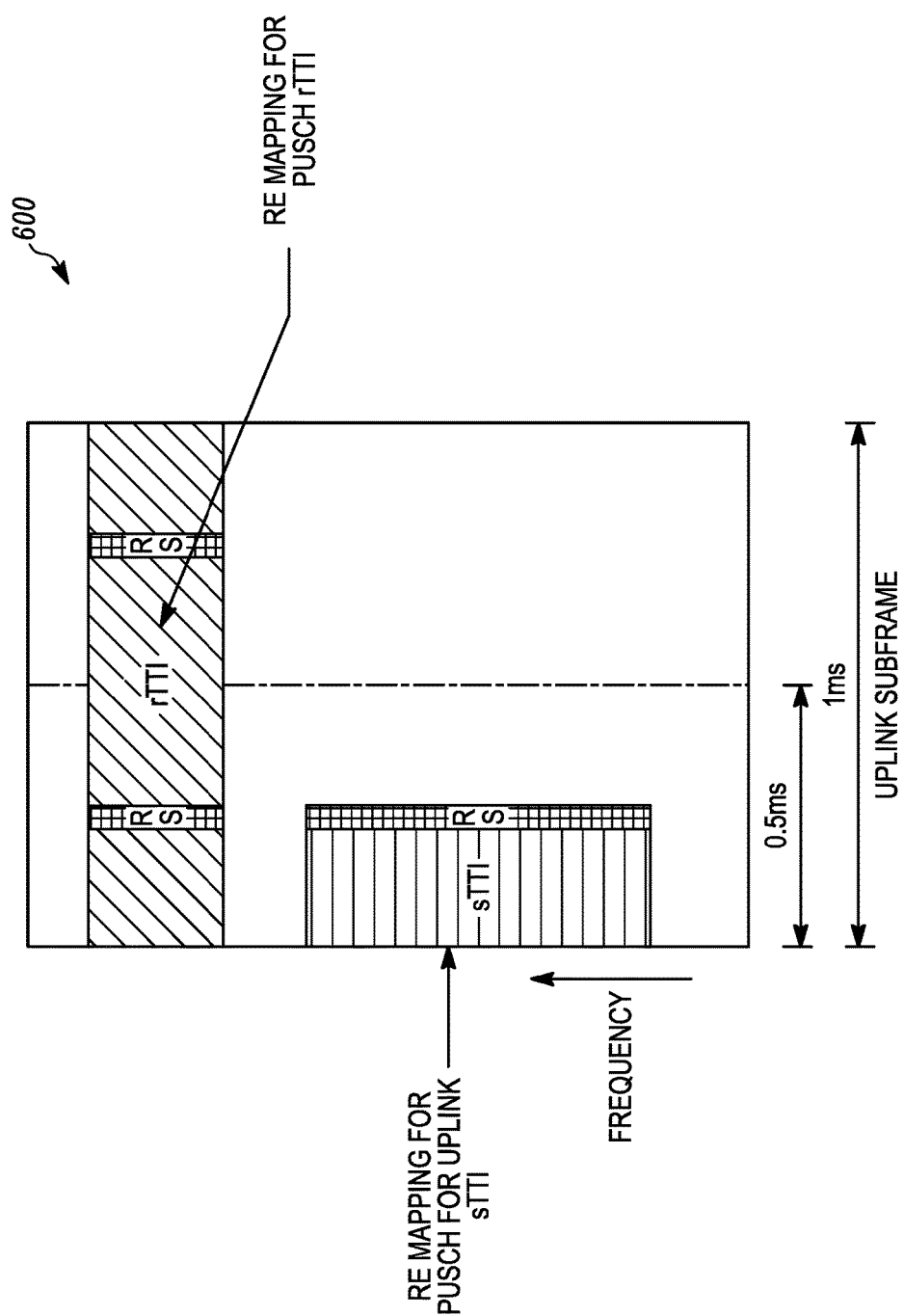
FIG. 6 is an example subframe showing uplink of simultaneous PUSCH on sTTI and rTTI with a common RS symbol location and separate DFT-precoding according to a possible embodiment.

FIG. 6 is an example subframe 600 showing uplink of simultaneous PUSCH on sTTI and rTTI with a common RS symbol location and separate DFT-precoding according to a possible embodiment. For UL shared channel for sTTI operation, uplink rTTI and sTTI within a subframe can have a common RS symbol location. In a case of simultaneous transmission on uplink rTTI and uplink sTTI within a subframe, such as with sTTI overlapping with rTTI in time and including a subset of SC-FDMA symbols, separate DFT-precoding can be applied for PUSCH corresponding to sTTI and rTTI to enable faster decoding, such as with separate receiver processing blocks for rTTI and sTTI with different power levels, different Modulation and Coding Schemes (MCS), and other differences.

Figure 7:
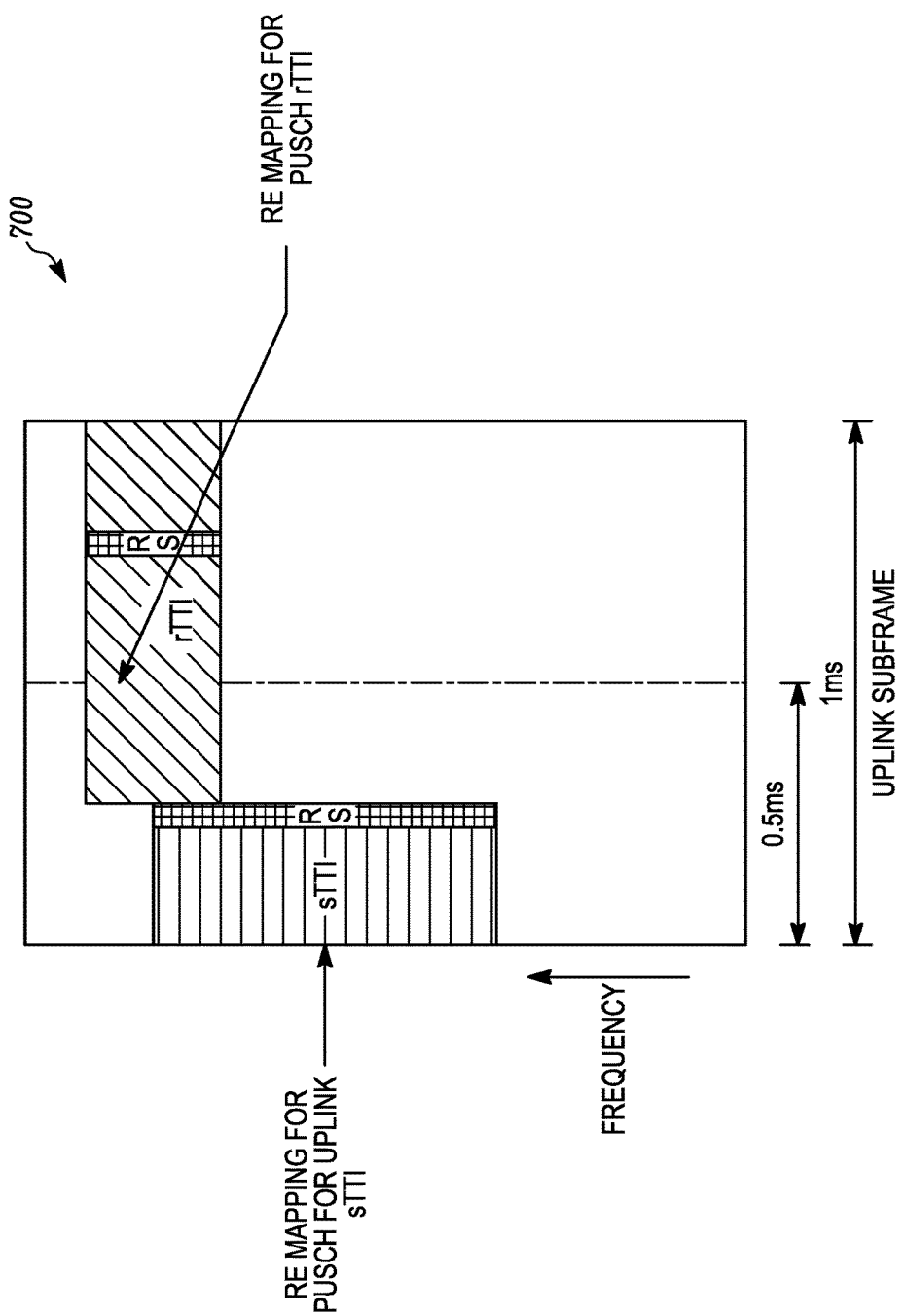
FIG. 7 is an example subframe showing uplink of simultaneous PUSCH on sTTI and rTTI with a common RS symbol location and separate DFT-precoding according to a possible embodiment.

FIG. 7 is an example subframe 700 showing uplink of simultaneous PUSCH on sTTI and rTTI with a common RS symbol location and separate DFT-precoding according to a possible embodiment. In a case where sTTI PUSCH REs overlaps with rTTI PUSCH REs within a subframe, PUSCH corresponding to sTTI can be transmitted, such as where sTTI preempts rTTI on the overlapping SC-FDMA symbols and rTTI SC-FDMA symbols are punctured. PUSCH corresponding to rTTI can be transmitted on the remaining SC-FDMA symbols.

In current LTE systems, the UE transmission power for a given serving cell is computed based on Path Loss (PL), a set of higher layer configured parameters, such as P0 and alpha, PRB-pairs allocated to the UE (M PUSCH RB), a configured maximum transmit power applicable to the subframe and serving cell for which the transmission is made, such as $P_{cmax\_c(n)}$ for serving cell c and subframe n, and power control adjustments received via DL physical layer control signaling (PDCCH/EPDCCH). For UE transmissions with shorter TTI, similar high level methodology as current LTE systems can be used. However, with sTTI operation overall system performance can be improved by configuring, for a given serving cell, a separate set of higher layer power control parameters, such as P0 and alpha, for regular TTI operation and for sTTI operation, for each physical channel. For example, separate higher layer parameters can be used for rTTI based PUSCH and sTTI based sPUSCH.

If a UE is scheduled to make a sTTI transmission and a rTTI transmission in the same subframe and same serving cell, the UE should ensure that the sTTI transmission is made in such a way that its total transmission power does not exceed the $P_{cmax\_c}$ value for that subframe and serving cell, where '_c' in the subscript can refer to the serving cell index. For a UE configured with multiple serving cells, such as a UE supporting carrier aggregation, if the UE has a regular TTI transmission on one serving cell and sTTI transmission on another serving cell, the UE can ensure that the total transmission power across both serving cells does not exceed the configured maximum transmit power applicable to the subframe ($P_{cmax}$) across all serving cells. This can be used to ensure that the UE's transmissions are compliant with any regulations defined for the frequency band(s) in which the UE is operating, to minimize out of band emissions and Adjacent Channel power Leakage Ratio (ACLR), and to minimize in-band interference by adhering to the power control limits.

If the UE has to make a sTTI based transmission in at least SC-FDMA symbol x in subframe n with transmission power Pstti, and the UE is also scheduled with a regular TTI transmission in subframe n with transmission power Prtti, the UE can use one or more of the following methods to determine the transmissions and power levels for subframe n.

According to one method to determine the transmissions and power levels for subframe n, the UE can determine priority of the transmissions according to one or more of the priority rules defined below, and transmit only the highest priority transmission, and drop all other transmissions in that subframe.

According to another method to determine the transmissions and power levels for subframe n, the UE can transmit both sTTI and regular transmission. This can be without any power scaling, if the total transmission power of both sTTI transmission and regular transmission, such as during all SC-FDMA symbol durations in the subframe, is smaller than $P_{cmax\_c}(n)$. If the total transmission power of both sTTI transmission and regular transmission would exceed $P_{cmax\_c}(n)$ during any SC-FDMA symbol duration in the subframe, the UE can scale either the sTTI transmission power or the regular transmission power according to one or more priority rules, such that, after scaling, total transmission power of both sTTI transmission and regular transmission would not exceed $P_{cmax\_c}(n)$ during all SC-FDMA symbol durations in the subframe.

One priority rule can be where transmission of a particular TTI length, such as a shorter TTI, can be prioritized over transmissions of another TTI length, such as a longer TTI. According to another example, a transmission with a longer TTI can be prioritized over a transmission with a shorter TTI. This can either be predefined or indicated to the UE via higher layer signaling or via other signalling as described below.

Another priority rule can be where the transmission to prioritize can be indicated via signaling to the UE. For example, if the UE is scheduled, such as via a first UL grant, to transmit in subframe n using regular TTI, and the UE is also scheduled, such as via a second UL grant, to transmit in a sTTI in subframe n, then a bit, such as a priority flag field, or code-point in the first grant can indicate whether the UE should prioritize that transmission scheduled by the first grant. Similarly, a bit, such as a priority flag field, or code-point in the second grant can indicate whether the UE should prioritize the transmission scheduled by the second grant.

Another priority rule can be a prioritization based on a combination of payload type, sTTI length and physical channel type. For example, considering the transmissions below, prioritization can be 1>2>3>4>5>6. Alternatively, prioritization can be 2>1>3>4>5>6. These numbers can indicate 1) sTTI transmission with HARQ-ACK; 2) sTTI transmission in response to an UL grant that has a priority flag field set to 1; 3) rTTI transmission with HARQ-ACK; 4) sTTI transmission without HARQ-ACK; 5) rTTI transmission without HARQ-ACK; and 6) SRS transmission.

The UE may need to scale the transmission power of the regular transmission in subframe n, due to overlap with sTTI transmission in symbol x of subframe n. The UE can scale the transmission power of the regular transmission in all SC-FDMA symbols of subframe n in which the regular transmission is made. For example, the UE can use the same transmission power for all SC-FDMA symbols of subframe n in which the regular transmission is made. This can make it easier for the network to decode the UE transmissions. Alternatively, the UE can scale the transmission power of the regular transmission in all SC-FDMA symbols of the slot of subframe n in which the regular transmission and the sTTI transmission overlap in time. Alternatively, the UE can scale the transmission power of the regular transmission in only SC-FMA symbol x of subframe n. This can ensure that at least the other symbols are transmitted with higher power and can improve robustness. However, the network should be able to take into account the power difference between various SC-FDMA symbols while decoding the regular transmission.

If the UE is scheduled to transmit a regular TTI transmission in a subframe, and multiple sTTI transmissions in the same subframe, the UE can scale the regular TTI transmission power such that the total transmission power considering the scaled regular TTI transmission power and the sTTI transmission with maximum power among the sTTI transmissions scheduled for the subframe does not exceed the configured maximum transmit power for that subframe. In some cases, such as when UL carrier aggregation is used, the regular TTI transmission and the sTTI transmission(s) can be scheduled on different uplink component carriers or serving cells. When regular TTI transmission and sTTI transmissions are made on the same serving cell, they can be generally made assuming the same Timing Advance (TA) value. The TA value can be used to determine the beginning of each UL subframe with respect to a corresponding DL subframe.

In order to assist the network with setting up or adjusting UL transmission power, the UE can send one or more types of Power Headroom Reports (PHRs). At a high level, for example, the UE can send a first type of PHR applicable to regular TTI transmission and a second type of PHR applicable to a shorter TTI transmission.

In another example, the UE can send a first type of PHR for a subframe where the configured maximum transmit power, such as $P_{cmax\_c}$, used for PHR computation for that subframe can be computed assuming only one type of TTI transmission(s) is/are present in the subframe, even if transmission(s) of both types of TTI transmission(s) are actually present in the subframe. This can be a PHR where configured maximum transmit power can be computed assuming only regular TTI transmissions are present in a subframe, even if both regular TTI and sTTI transmissions are actually scheduled for the subframe. The UE can also send a second type of PHR for the subframe where the PHR can be computed assuming both regular TTI transmission(s) and sTTI transmission(s) are present in the subframe, even if only one type of TTI transmission is actually transmitted in the subframe. For example, the UE can report a PHR, where the PHR can be computed assuming the UE has both an sTTI transmission and a regular TTI transmission in the subframe. If the UE actually is scheduled to transmit only a regular TTI transmission in a subframe, it can assume a fixed resource allocation, such as 1 RB, and TPC command value, such as 0 dB, power adjustment for the assumed sTTI transmission that is used for PHR computation.

Figure 8:
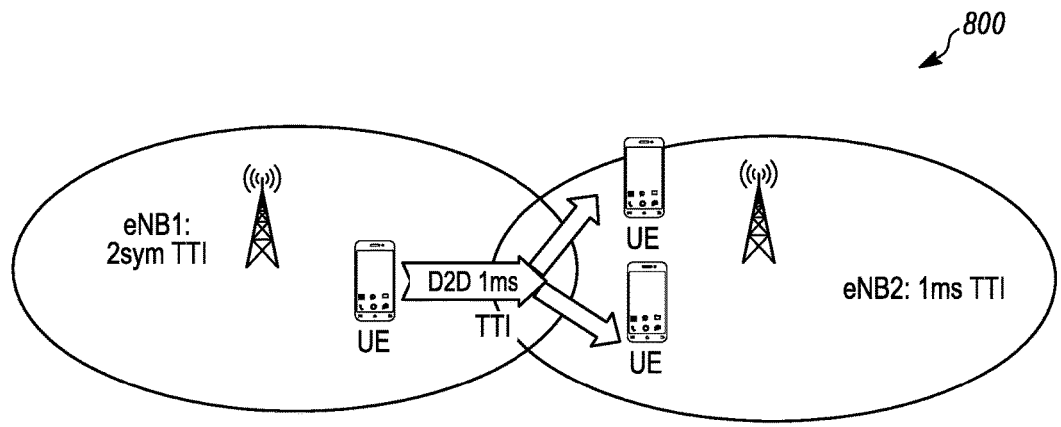
FIG. 8 is an example illustration of device-to-device operation according to a possible embodiment.

FIG. 8 is an example illustration 800 of Device-to-Device (D2D), such as sidelink, operation according to a possible embodiment. D2D can be a broadcast type communication where a transmitting device may not have an idea of the configuration of receiving devices, such as the TTI length used by receiving UEs for doing UL/DL communication with the base-station. Therefore, a common TTI length for D2D operation can be used for all UEs. For instance, to maintain backward compatibility, 1 ms TTI can be used for D2D operation, such as for discovery and communication, while each UE may support shortened TTI(s) for the purpose of UL or DL communication with an eNB. Assuming using a common TTI length for D2D operation, such as 1 ms, coexistence with cellular operation can be ensured.

Figure 9:
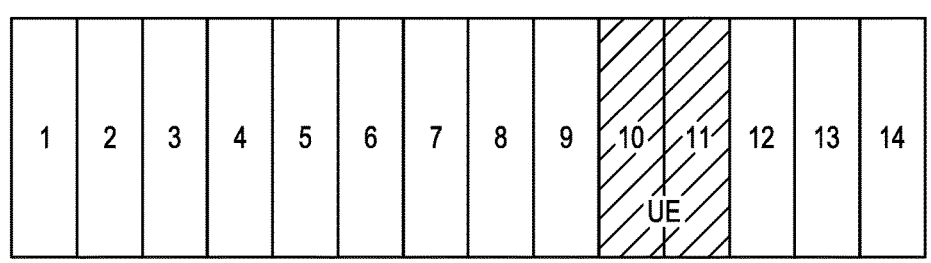
FIG. 9 is an example illustration of a 1 ms device-to-device subframe with 2 symbol UL data in symbols 9-10 according to a possible embodiment.

FIG. 9 is an example illustration of a 1 ms D2D subframe 900 with 2 symbol UL data in symbols 9-10 according to a possible embodiment. Priority can be given to cellular operation from a single-user perspective; that is if a UE's UL communication overlaps with its side-link transmission, the side-link transmission can be dropped. If a UE is transmitting a D2D signal using 1 ms-TTI and it is scheduled to transmit UL data in symbols 9 and 10, the UE may not transmit the D2D signal at symbols 9 and 10. However, the UE does not need to drop the whole D2D subframe, which is the case with the current specifications. Different methods can be used to handle the case that the sidelink operation coincides with the sTTI operation in UL in a subframe.

According to a possible method, when the D2D subframe and the sTTI data overlap, the whole D2D subframe can be dropped, and only the data in the sTTI can be sent by the UE. This approach can be compatible with the existing specifications, but could affect, such as lead to dropping, multiple subframes depending on the arrival rate of the low-latency data as well as the HARQ and TCP ACK delays, while there is only a small fraction of the subframe(s) colliding with the sTTI data. For example, for the Round Trip Time (RTT) HARQ delay of 8 TTIs, and the TTI length of 2 symbols, all consecutive UL subframes can contain a sTTI data each only in 2 symbols out of 14 symbols. In a case of a D2D subframe configuration, such as an indication, of consecutive subframes, multiple D2D subframes can be dropped.

According to another possible method, D2D receivers, such as receiving UEs, can be informed of which symbols can be punctured in a D2D subframe. For example, within the or at the beginning of the D2D subframe, the transmitting UE can inform all the D2D recipients which symbol indices are to be punctured, such as used for non-D2D operation. The information could be conveyed explicitly or implicitly, such as via a scrambling sequence. Because of the different TA assumptions for UL and D2D, the receiving and also transmitting UEs may drop the preceding symbol prior to signaled UL transmission position as well. The transmitting UE can also indicate such a puncturing in scheduling assignment transmitted to the D2D receivers. If a good portion of the D2D subframe is to be used by sTTI UL operation, then the UE can drop the D2D subframe. The dropping threshold, such as more than a slot in time, can be signaled by the serving cell, or be fixed in the specification. Unlike the existing specifications wherein D2D reception is not possible in a subframe where the receiving D2D UE has an UL data to send, in the case of sTTI operation, when a D2D receiving UE has a sTTI for UL transmission, just those affected symbols by UL transmission may not be used for D2D reception.

Figure 10:
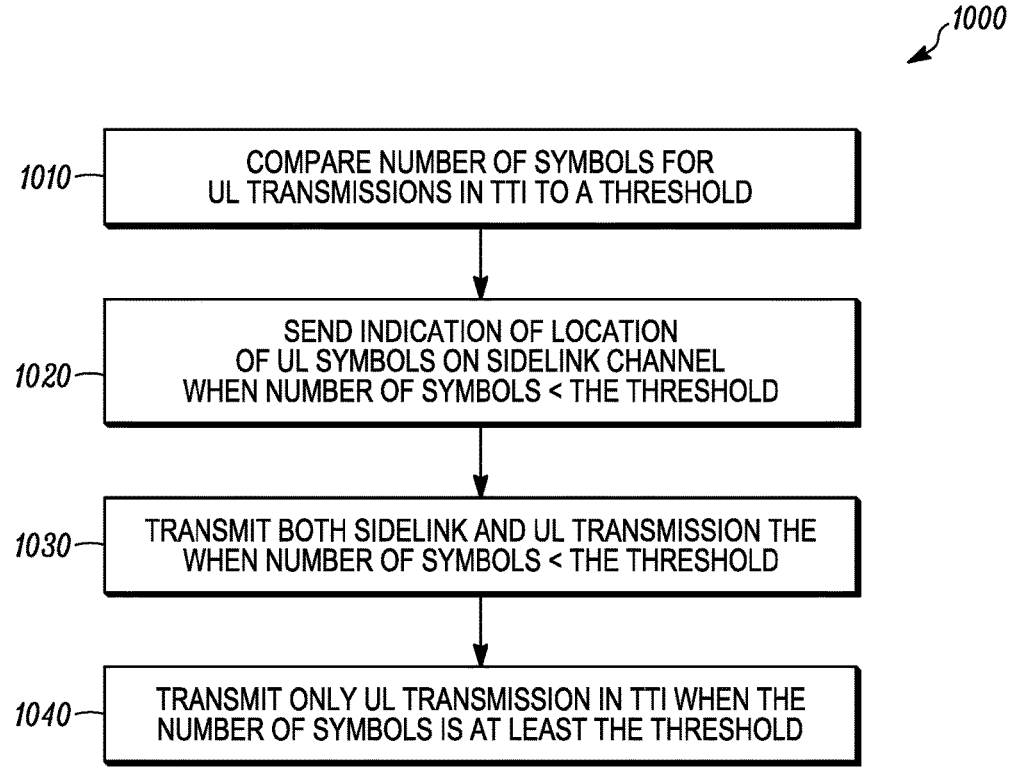
FIG. 10 is an example flowchart illustrating the operation of a device according to a possible embodiment.

FIG. 10 is an example flowchart 1000 illustrating the operation of a device, such as the device 110, according to a possible embodiment. At 1010, a number of SC-FDMA symbols used for UL transmissions in a TTI can be compared to a threshold value of SC-FDMA symbols. The TTI can be 1 ms. The threshold value can be received from a serving cell associated with the UL transmission. The threshold value can also be a predetermined value. The TTI can be a first TTI that has a first TTI length.

At 1020, an indication can be sent from a device on a sidelink channel. The indication can indicate the location of SC-FDMA symbols used for an UL transmission when the UL transmission occupies a number of SC-FDMA symbols less than the threshold value. The sidelink channel can be a channel for communicating with at least one Device-to-Device (D2D) device. The sidelink channel can be a sidelink shared channel, sidelink control channel, sidelink discovery channel, and/or any other sidelink channel. For example, sidelink channel communications can be made according to a sidelink transmission mode 1, a sidelink transmission mode 2, a sidelink discovery type 1, sidelink discovery type 2B, and/or any other sidelink communication procedures. The indication can be sent in a scheduling assignment transmitted by the device on the sidelink channel. The location of the SC-FDMA used for UL transmission can be indicated using a scrambling sequence used for the sidelink transmission.

At 1030, both a sidelink transmission and the UL transmission can be transmitted in the TTI when the UL transmission occupies the number of SC-FDMA symbols less than the threshold value. A symbol associated with the sidelink transmission can be dropped where the symbol can immediately precede the UL transmission when the UL transmission occupies the number of SC-FDMA symbols less than the threshold value. The sidelink transmission and the UL transmission may not overlap in time.

At 1040, only the UL transmission can be transmitted in the TTI when the UL transmission occupies a number of SC-FDMA symbols that are at least the threshold value. All sidelink transmissions scheduled during the TTI can be dropped when transmitting only the UL transmission. The UL transmission can be transmitted using a second TTI that has a TTI length smaller than the first TTI length, where the first TTI and the second TTI can overlap in time.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 11:
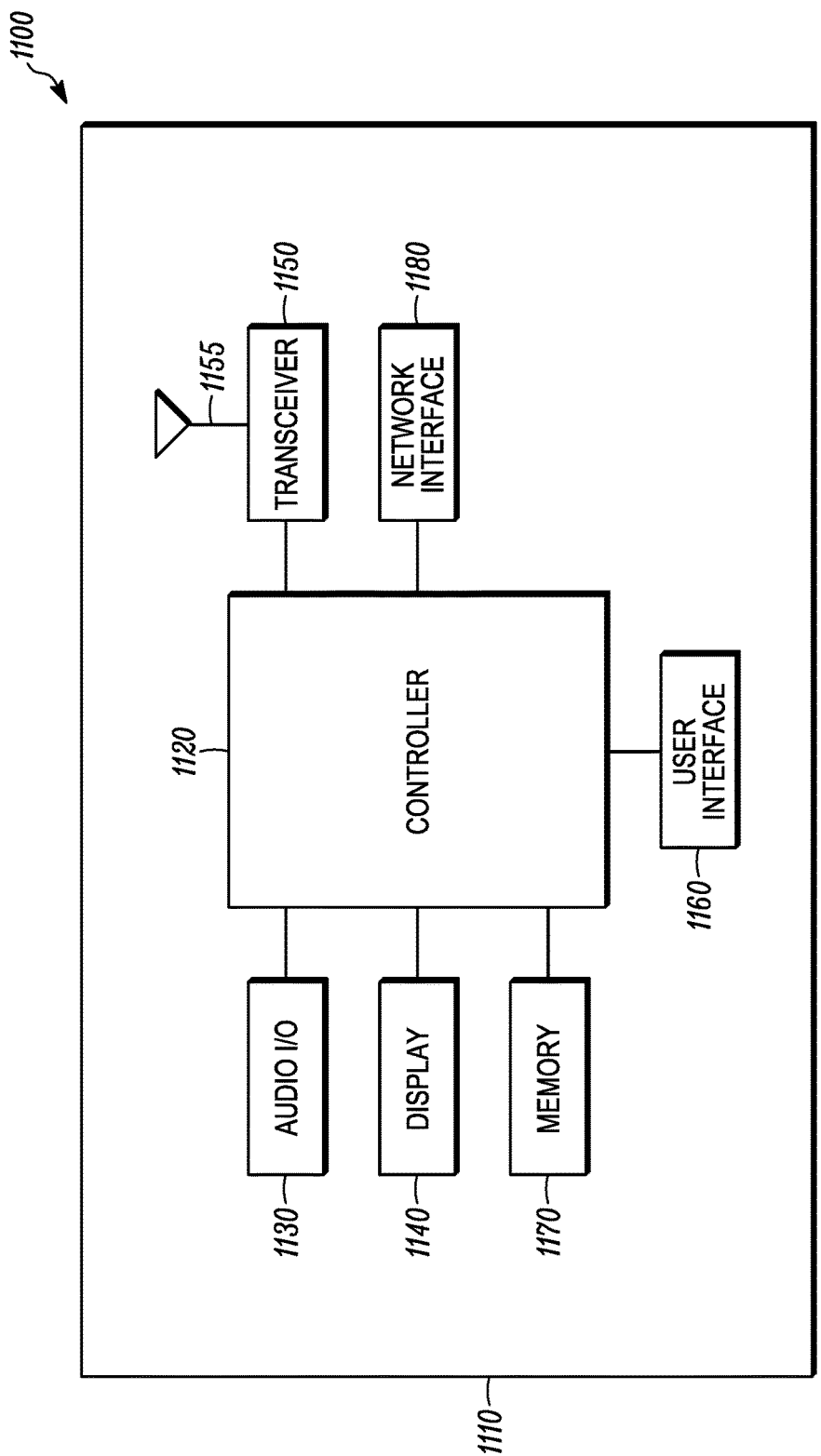
FIG. 11 is an example block diagram of an apparatus according to a possible embodiment.

FIG. 11 is an example block diagram of an apparatus 1100, such as the wireless communication device 110, according to a possible embodiment. The apparatus 1100 can include a housing 1110, a controller 1120 within the housing 1110, audio input and output circuitry 1130 coupled to the controller 1120, a display 1140 coupled to the controller 1120, a transceiver 1150 coupled to the controller 1120, an antenna 1155 coupled to the transceiver 1150, a user interface 1160 coupled to the controller 1120, a memory 1170 coupled to the controller 1120, and a network interface 1180 coupled to the controller 1120. The apparatus 1100 can perform the methods described in all the embodiments.

The display 1140 can be a viewfinder, a liquid crystal display (LCD), a light emitting diode (LED) display, a plasma display, a projection display, a touch screen, or any other device that displays information. The transceiver 1150 can include a transmitter and/or a receiver. The audio input and output circuitry 1130 can include a microphone, a speaker, a transducer, or any other audio input and output circuitry. The user interface 1160 can include a keypad, a keyboard, buttons, a touch pad, a joystick, a touch screen display, another additional display, or any other device useful for providing an interface between a user and an electronic device. The network interface 1180 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 1170 can include a random access memory, a read only memory, an optical memory, a flash memory, a removable memory, a hard drive, a cache, or any other memory that can be coupled to an apparatus.

The apparatus 1100 or the controller 1120 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1170 or elsewhere on the apparatus 1100. The apparatus 1100 or the controller 1120 may also use hardware to implement disclosed operations. For example, the controller 1120 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1120 may be any controller or processor device or devices capable of operating an apparatus and implementing the disclosed embodiments.

In operation according to a possible embodiment, the controller 1120 can determine a first resource used for transmitting a scheduling request indication in a subframe. The first resource can be associated with uplink data transmissions using a first TTI length. The first TTI length can include a first number of SC-FDMA symbols. The controller 1120 can determine a second resource used for transmitting a scheduling request indication in the subframe. The second resource can be associated with uplink data transmissions using a second TTI length. The second TTI length can include a second number of SC-FDMA symbols. The second number of SC-FDMA symbols can be smaller than the first number of SC-FDMA symbols.

The controller 1120 can select a scheduling request indication resource from one of the first resource and the second resource. The controller 1120 can select the second resource as the scheduling request indication resource when the apparatus 1100 has data to transmit using a TTI with the second number of SC-FDMA symbols. The controller 1120 can also select the second resource as the scheduling request indication resource when the apparatus 1100 has data to transmit with a particular characteristic and can select the first resource as the scheduling request indication resource when the apparatus has data to transmit without the particular characteristic. The transceiver 1150 can transmit the scheduling request indication in the selected scheduling request indication resource in the subframe.

According to a possible implementation, the first resource can be a first PUCCH resource and the second resource can be a second PUCCH resource. The transceiver 1150 can transmit an HARQ-ACK indication in the selected scheduling request indication resource when the device has to transmit the HARQ-ACK indication in the subframe.

According to another possible implementation, the first resource can be a PUCCH resource and the second resource can be a SRS resource. The transceiver 1150 can transmit the scheduling request instead of a pre-configured SRS transmission in the subframe when the apparatus 1100 also has to transmit the pre-configured SRS transmission in the subframe and when the selected scheduling request indication resource is the second resource.

According to another possible implementation, the first resource can be a first PRACH resource and the second resource can be a second PRACH resource. The controller 1120 can select the second PRACH resource as the scheduling request indication when the apparatus 1100 has data to transmit using the second TTI length. The transceiver 1150 can transmit a RACH preamble using the second PRACH resource in the subframe.

According to another possible implementation, the first resource can be a PUCCH resource and the second resource can be a DMRS resource. The transceiver 1150 can transmit DMRS using at least one selected from a DMRS cyclic shift value associated with a scheduling request transmission and an orthogonal sequence associated with a scheduling request transmission.

In operation according to another possible embodiment, the controller 1120 can use a first Buffer Status Report (BSR) configuration when the apparatus 1100 is configured for UL transmissions with a first TTI length and use a second BSR configuration when the apparatus 1100 is configured for UL transmissions with at least a second TTI length that is shorter than the first TTI length. The controller 1120 can determine whether the apparatus 1100 has data to transmit with a particular characteristic. The data to transmit with a particular characteristic can be data that requires using TTI resources of the second TTI length. The particular characteristic can be a particular QoS class identifier, a particular resource type, a particular priority level, a particular packet delay budget, a particular packet error loss rate, a particular latency requirement, a particular logical channel group identifier, and/or any other characteristic that can affect a BSR configuration. The particular characteristic can be associated with a reduced latency data transmission that has a latency reduced from other data transmission latency.

The transceiver 1150 can send a BSR using the second BSR configuration when the apparatus 1100 has data to transmit with the particular characteristic. The transceiver 1150 can send a BSR using the first BSR configuration when the apparatus 1100 has data to transmit without the particular characteristic.

In operation according to another possible embodiment, the transceiver 1150 can receive a first downlink transmission in a first downlink TTI of a first duration in a first downlink subframe. The first downlink transmission can be a PDSCH transmission. The first downlink transmission can also be a control channel transmission indicating a SPS release. The transceiver 1150 can receive a second downlink transmission in a second downlink TTI of a second duration in a second downlink subframe. The first downlink TTI and second downlink TTI may not overlap. The second downlink transmission can be a PDSCH transmission.

The controller 1120 can determine a first HARQ-ACK feedback and a first HARQ-ACK PUCCH resource in response to receiving the first downlink transmission in the first downlink TTI. The first HARQ-ACK PUCCH resource can be mapped to REs in a first uplink TTI of a third duration in a first uplink subframe.

The controller 1120 can determine a second HARQ-ACK feedback and a second HARQ-ACK PUCCH resource in response to receiving the second downlink transmission in the second downlink TTI. The second HARQ-ACK PUCCH resource can be mapped to REs in a second uplink TTI of a fourth duration in the first uplink subframe. The first UL TTI can include a temporal portion that overlaps the second UL TTI. According to a possible implementation, the second downlink transmission can include two transport blocks and the second HARQ-ACK feedback can be a spatial HARQ-ACK bundled response by a logical AND operation of corresponding individual HARQ-ACKs for the two transport blocks.

According to another possible implementation, the first downlink subframe can be different from the second downlink subframe, the second duration can be smaller than the first duration, and the fourth duration can be smaller than the third duration. According to another possible implementation, the first downlink subframe can be the same as the second downlink subframe, the second duration can be equal to the first duration, and the fourth duration can be equal to the third duration. According to another possible implementation, the second duration can be smaller than the fourth duration. According to another possible implementation, the first downlink TTI can include a first number of OFDM symbols, the second downlink TTI can include a second number of OFDM symbols, the first uplink TTI can include a first number of SC-FDMA symbols, and the second uplink TTI can include a second number of SC-FDMA symbols.

The controller 1120 can select between the first HARQ-ACK PUCCH resource and the second HARQ-ACK PUCCH resource based on at least the determined second HARQ-ACK feedback. The transceiver 1150 can transmit a signal in response to the determined first HARQ-ACK feedback and second HARQ-ACK feedback on the selected HARQ-ACK PUCCH resource on the overlapped portion of first uplink TTI and second uplink TTI in the first uplink subframe. According to a possible implementation, the transmitted signal comprises a first signal and the transceiver can transmit a second signal in response to the determined first HARQ-ACK feedback on the first HARQ-ACK PUCCH resource on a temporal portion of the first UL TTI that does not overlap the second UL TTI.

In operation according to another possible embodiment, the controller 1120 can determine a first transmission power of a first uplink transmission based on a first set of higher layer configured power control parameters associated with a first TTI length. The higher layer can be higher than a physical layer. The first uplink transmission can span the first TTI length. The first TTI length can include a first number of SC-FDMA symbols. The first uplink transmission can carry data, HARQ-ACK, and/or any other transmission.

The controller 1120 can determine a second transmission power of a second uplink transmission based on a second set of higher layer configured power control parameters associated with a second TTI length. The second uplink transmission can span the second TTI length. The second TTI length can include a second number of SC-FDMA symbols. The second number can be different from the first number. The second uplink transmission can carry data, HARQ-ACK, and/or any other transmission.

According to a possible implementation, the controller 1120 can determine the first transmission power of the first uplink transmission such that the combined transmission power of the first uplink transmission and the second uplink transmission during any SC-FDMA symbol in the subframe does not exceed a configured maximum transmit power value. According to another possible implementation, the controller 1120 can determine the first transmission power of the first uplink transmission based on a priority rule according to which the first uplink transmission has a lower priority than the second uplink transmission.

The transceiver 1150 can transmit the first uplink transmission in a subframe using the first transmission power. The transceiver 1150 can transmit at least the second uplink transmission in the subframe using the second transmission power. The first uplink transmission and the second uplink transmission overlap in time for at least one SC-FDMA symbol duration.

In operation according to another possible embodiment, the controller 1120 can compute a first type of power headroom report (PHR) based on transmissions of a first TTI length only being present in a subframe. The controller 1120 can compute the first type of PHR based on transmissions of the first TTI length only being present in the subframe even if transmissions of the first TTI length and transmissions of a second TTI length are present in the subframe. The controller 1120 can compute the first type of PHR based on a first set of higher layer configured power control parameters associated with the first TTI length.

The controller 1120 can compute a second type of PHR based on transmissions of both the first TTI length and the second TTI length being present in the subframe. The controller can compute the second type of PHR based on transmissions of both the first TTI length and a second TTI length being present in the subframe even if transmissions of only one of the first TTI length and the second TTI length are present in the subframe. The controller 1120 can compute the second type of PHR based on a fixed resource block allocation and a fixed TPC command value if the transmissions of the second TTI length are not present in the subframe. The controller 1120 can compute the second type of PHR based on the first set of higher layer configured power control parameters associated with the first TTI length and a second set of higher layer configured power control parameters associated with the second TTI length. The controller 1120 can compute the second type of PHR based on a fixed resource block allocation and a fixed TPC command value for the transmissions of the second TTI length. The controller 1120 can compute the second type of PHR based on a resource block allocation and a TPC command value received in an uplink grant for the physical channel transmission of the second TTI length.

The controller 1120 can compute the first type of PHR and/or the second type of PHR by computing the PHR based on a transmission of only a first type of physical channel in the subframe. The first type of physical channel can be a PUSCH. The controller 1120 can compute the first type of PHR and/or the second type of PHR by computing the PHR based on at least two types of physical channels in the subframe. The first type of physical channel of the at least two types can be a PUSCH and the second type of physical channel of the at least two types can be a PUCCH.

The transceiver 1150 can transmit the first type of PHR and at least the second type of PHR. The transceiver 1150 can transmit at least the second type of PHR in the subframe using a physical channel transmission of the first TTI length and the second TTI length can be shorter than the first TTI length. The transceiver 1150 can transmit the second type of PHR in the subframe using a physical channel transmission of the second TTI length and the second TTI length can be shorter than the first TTI length.

In operation according to another possible embodiment, the controller 1120 can compare a number of SC-FDMA symbols used for UL transmissions in a TTI to a threshold value of SC-FDMA symbols. The transceiver 1150 can send an indication on a sidelink channel. The indication can indicate the location of SC-FDMA symbols used for an UL transmission when the UL transmission occupies a number of SC-FDMA symbols less than the threshold value. The indication can be sent in a scheduling assignment transmitted by the apparatus on the sidelink channel. The location of the SC-FDMA used for UL transmission can be indicated using a scrambling sequence used for the sidelink transmission. The sidelink channel can be a sidelink shared channel, sidelink control channel, sidelink discovery channel, and/or any other sidelink channel. The transceiver 1150 can transmit both a sidelink transmission and the UL transmission in the TTI when the UL transmission occupies the number of SC-FDMA symbols less than the threshold value. The controller 1120 can drop a symbol associated with the sidelink transmission when the UL transmission occupies the number of SC-FDMA symbols less than the threshold value, where the symbol can immediately precede the UL transmission. The sidelink transmission and the UL transmission may not overlap in time. The transceiver 1150 can transmit only the UL transmission in the TTI when the UL signal occupies a number of SC-FDMA symbols that are at least the threshold value. The transceiver 1150 can transmit only the UL transmission by dropping all sidelink transmissions scheduled during the TTI. The TTI can be a first TTI that has a first TTI length and the UL transmission can be transmitted using a second TTI that has a TTI length smaller than the first TTI length, where the first TTI and the second TTI overlap in time.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method comprising:
    comparing a number of symbols used for uplink transmissions in a transmit time interval to a threshold number of symbols;
    sending, from a device, an indication on a sidelink channel to at least one peer device, the indication indicating the location of symbols used for an uplink transmission if the uplink transmission occupies a number of symbols less than the threshold number of symbols;
    transmitting both a sidelink transmission and the uplink transmission in the transmit time interval if the uplink transmission occupies the number of symbols less than the threshold number of symbols; and
    transmitting only the uplink transmission in the transmit time interval if the uplink transmission occupies a number of symbols that are at least the threshold number of symbols.

2. The method according to claim 1 wherein a sidelink channel comprises a channel for communicating with at least one device-to-device device.

3. The method according to claim 1, wherein the transmit time interval comprises 1 ms.

4. The method according to claim 1, wherein the indication is sent in a scheduling assignment transmitted by the device on the sidelink channel.

5. The method according to claim 1, wherein the location of the single carrier-frequency division multiple access used for uplink transmission is indicated using a scrambling sequence used for the sidelink transmission.

6. The method according to claim 1, further comprising dropping a symbol associated with the sidelink transmission, the symbol immediately preceding the uplink transmission if the uplink transmission occupies the number of symbols less than the threshold number of symbols.

7. The method according to claim 1, wherein the threshold number of symbols is received from a serving cell associated with the uplink transmission.

8. The method according to claim 1, wherein the threshold number of symbols is predetermined.

9. The method according to claim 1, wherein transmitting only the uplink transmission further comprises dropping all sidelink transmissions scheduled to and from the device during the transmit time interval.

10. The method according to claim 1, wherein the sidelink transmission and the uplink transmission do not overlap in time.

11. The method according to claim 1,
    wherein the transmit time interval is a first transmit time interval that has a first transmit time interval length, and
    wherein the uplink transmission is transmitted using a second transmit time interval that has a transmit time interval length smaller than the first transmit time interval length, where the first transmit time interval and the second transmit time interval overlap in time.

12. The method according to claim 1, wherein the sidelink channel comprises at least one selected from a sidelink shared channel, sidelink control channel, and sidelink discovery channel.

13. The method according to claim 1, wherein the symbols comprise single carrier-frequency division multiple access symbols.

14. An apparatus comprising:
    a controller to compare a number of symbols used for uplink transmissions in a transmit time interval to a threshold number of symbols; and
    a transceiver to
        send an indication on a sidelink channel to at least one peer device, the indication indicating the location of symbols used for an uplink transmission if the uplink transmission occupies a number of symbols less than the threshold number of symbols,
        transmit both a sidelink transmission and the uplink transmission in the transmit time interval if the uplink transmission occupies the number of symbols less than the threshold number of symbols, and
        transmit only the uplink transmission in the transmit time interval if the uplink transmission occupies a number of symbols that are at least the threshold number of symbols.

15. The apparatus according to claim 14, wherein the indication is sent in a scheduling assignment transmitted by the apparatus on the sidelink channel.

16. The apparatus according to claim 14, wherein the location of the single carrier-frequency division multiple access used for uplink transmission is indicated using a scrambling sequence used for the sidelink transmission.

17. The apparatus according to claim 14, wherein the controller drops a symbol associated with the sidelink transmission, the symbol immediately preceding the uplink transmission if the uplink transmission occupies the number of symbols less than the threshold number of symbols.

18. The apparatus according to claim 14, wherein the transceiver transmits only the uplink transmission by dropping all sidelink transmissions to and from the device scheduled during the transmit time interval.

19. The apparatus according to claim 14, wherein the sidelink transmission and the uplink transmission do not overlap in time.

20. The apparatus according to claim 14,
    wherein the transmit time interval is a first transmit time interval that has a first transmit time interval length, and
    wherein the uplink transmission is transmitted using a second transmit time interval that has a transmit time interval length smaller than the first transmit time interval length, where the first transmit time interval and the second transmit time interval overlap in time.

21. The apparatus according to claim 14, wherein the sidelink channel comprises at least one selected from a sidelink shared channel, sidelink control channel, and sidelink discovery channel.

* * * * *

UNITED STATES PATENT AND TRADEMARK OFFICE
CERTIFICATE OF CORRECTION

| | |
|---|---|
| PATENT NO. | : 10,172,156 B2 |
| APPLICATION NO. | : 15/262499 |
| DATED | : January 1, 2019 |
| INVENTOR(S) | : Nory et al. |

Page 1 of 1

It is certified that error appears in the above-identified patent and that said Letters Patent is hereby corrected as shown below:

On the Title Page

Please insert item:
--Related U.S. Application Data:
(60) Provisional application No. 62/317,149, filed on Apr. 1, 2016.--

Signed and Sealed this
Twenty-fifth Day of June, 2019

Andrei Iancu
*Director of the United States Patent and Trademark Office*